(12) United States Patent
Matsuo et al.

(10) Patent No.: US 7,686,369 B2
(45) Date of Patent: Mar. 30, 2010

(54) WINDSHIELD DEVICE, AND COOL AIRFLOW DEVICE FOR SADDLE RIDE TYPE VEHICLE

(75) Inventors: Hisashi Matsuo, Saitama (JP); Emi Shida, Saitama (JP); Takefumi Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/024,890

(22) Filed: Feb. 1, 2008

(65) Prior Publication Data

US 2008/0185865 A1 Aug. 7, 2008

(30) Foreign Application Priority Data

| Feb. 6, 2007 | (JP) | ............................. 2007-026776 |
| Feb. 6, 2007 | (JP) | ............................. 2007-026777 |
| Feb. 6, 2007 | (JP) | ............................. 2007-026778 |

(51) Int. Cl.
    *B62J 17/04* (2006.01)
(52) U.S. Cl. ..................................... 296/78.1
(58) Field of Classification Search ................. 296/78.1
    See application file for complete search history.

(56) References Cited

U.S. PATENT DOCUMENTS 4,911,494 A * 3/1990 Imai et al. .................. 296/78.1
5,409,287 A * 4/1995 Suzuki ..................... 296/180.1
7,261,358 B2 * 8/2007 Kurakawa et al. .......... 296/78.1
2006/0022490 A1 2/2006 Kurakawa et al.

FOREIGN PATENT DOCUMENTS

| DE | 20 2006 005 948 U1 | 6/2006 |
| EP | 1 905 679 A1 | 4/2008 |
| JP | 62-11089 U | 1/1987 |
| JP | 64-1671 A | 1/1989 |

\* cited by examiner

*Primary Examiner*—Dennis H Pedder
(74) *Attorney, Agent, or Firm*—Birch, Stewart, Kolasch & Birch, LLP

(57) ABSTRACT

A windshield device provided at a front part of a vehicle body of a saddle ride type vehicle includes an air introduction port provided at a front part of the windshield device and opened toward the front side of the vehicle body. An air blow-off port is provided at an upper part of the windshield device and is opened toward the upper side. An air duct establishing communication between the air introduction port and the air blow-off port through an air passage extends rearwardly upwards. A straightening vane extends sideways in the air passage and is inclined rearwardly upwards so as to be along the air passage. In side view of the vehicle, a first straight line connecting both ends of the straightening vane is disposed at an obtuse angle in relation to a second straight line that is orthogonal to a steering axis and extends to a grounding point of a rear wheel.

7 Claims, 15 Drawing Sheets

WINDSHIELD DEVICE, AND COOL AIRFLOW DEVICE FOR SADDLE RIDE TYPE VEHICLE

CROSS-REFERENCE TO RELATED APPLICATIONS

This nonprovisional application claims priority under 35 U.S.C. § 119(a) on Patent Application Nos. 2007-026776, 2007-026777 and 2007-026778, each application filed in Japan on Feb. 6, 2007. The entirety of each of the above-identified applications is incorporated herein by reference.

BACKGROUND OF THE INVENTION

1. Field of the Invention

The present invention relates to a windshield device covering a front part of a vehicle body of a saddle ride type vehicle such as a motorcycle. The present invention also relates to a cool airflow device utilizing the running airflow in a saddle ride type vehicle such as a motorcycle.

2. Background of the Invention

A windshield device in the background art has been proposed, in which an air blow-off port that is opened to the upper side is provided at an upper end part of a portion supporting both sides of the screen (refer to, for example, Japanese Patent Laid-open No. Sho 64-001671). In this windshield device, part of the running airflow taken in through an air introduction port provided on the lower side of the above-mentioned supporting portion is blown off upwards through the air blow-off port. The running airflow as a whole is guided by the airflow so as to avoid the rider seated on the rear side of the screen, whereby a good windshield effect (screen effect) is obtained while suppressing the magnitude of the screen height.

In motorcycles and the like in recent years, there is a desire for a further enhancement of amenity in running at the times of high-speed running and the like. In the above-mentioned windshield device, it is also desirable to provide a configuration with which the screen effect can be enhanced and which can contribute to enhancement of the amenity in running at the times of high-speed running and the like.

In addition, in saddle ride type vehicles according to the background art, such as motorcycles, in which a windshield device is provided at a front part of the vehicle body so as to obtain a windshield effect for the rider, the windshield device is provided at a part thereof with an air guide part for guiding a portion of a running airflow to the inside thereof. The running airflow (cool airflow) can be supplied to the rider on the inside (rear side) of the windshield device through the air guide part (refer to, for example, Japanese Utility Model Laid-open No. Sho 62-011089). According to this configuration, a cooling airflow can be supplied to the rider wearing a helmet and/or rider suits, whereby a comfortable driving can be realized.

However, even where such a configuration is adopted, when the outside air temperature is high, the temperature of the running airflow itself is high, and it is difficult to supply the rider with the running airflow as a cool airflow.

SUMMARY OF THE INVENTION

In view of the above, it is a first object of the present invention to obtain an enhanced screen effect and an enhanced amenity in running, in a windshield device including an air duct for blowing off a running airflow toward the upper side.

It is a second object of the present invention to realize comfortable driving even when the outside air temperature is high, in a cool airflow device for a saddle ride type vehicle in which the running airflow is utilized.

In order to attain the above-mentioned first object, the present invention adopts the following means (1) to (9).

(1). The present invention provides a windshield device provided at a front part of a vehicle body of a saddle ride type vehicle, including: an air introduction port provided at a front part of the windshield device and opened toward the front side of the vehicle; an air blow-off port provided at an upper part of the windshield device and opened toward the upper side; an air duct establishing communication between the air introduction port and the air blow-off port through an air passage extending rearwardly upwards; and a straightening vane extending sideways in the air passage and inclined rearwardly upwards so as to be along the air passage; wherein in side view of the vehicle, a first straight line connecting both ends of the straightening vane is disposed at an obtuse angle in relation to a second straight line being orthogonal to a steering axis and extending to a grounding point of a rear wheel.

According to the above-mentioned windshield device, the running airflow taken into the air duct through the air introduction port is blown off upwards through the air blow-off port, whereby the airflow inclusive of the surrounding airflows can be so guided as to avoid the rider seated on the rear side of the windshield device. Therefore, a good screen effect for the rider can be obtained while suppressing the magnitude of the height of the windshield device (screen height).

In addition, with the straightening vane(s) provided in the air passage, it is possible to obtain a straightening effect on the airflow passing through the air passage, and to reduce a negative-pressure zone in the air passage, thereby reducing the passage resistance. Therefore, the screen effect can be enhanced her.

Furthermore, with the straightening vane(s) disposed at an obtuse angle in relation to the second straight line, the running resistance due to the running airflow pressure can be lessened, and a downward lift exerted on the straightening vane(s) by the running airflow pressure can be utilized as a down force exerted on the front wheel. Therefore, it is possible to obtain an enhanced amenity in running, especially at the times of high-speed running and the like.

(2). The windshield device may have a configuration in which the air passage has a curved part curved to be inclined more steeply as one goes toward the rear side, and the straightening vane is curved so as to be along the curved part and is provided in the curved part.

(3). The windshield device may have a configuration in which a plurality of the straightening vanes is provided.

(4). The windshield device may have a configuration in which the straightening vane is provided to be continuous from the air introduction port to the air blow-off port, the air passage has a curved part curved to be inclined more steeply as one goes toward the rear side in side view of the vehicle, the air passage provided in the curved part and on at least one of the face side and the back side of the straightening vane is provided with an auxiliary straightening vane curved similarly to the curved part, and a third straight line connecting both ends of the auxiliary straightening vane is disposed at an obtuse angle in relation to the second straight line in side view of the vehicle.

(5). The windshield device may have a configuration in which the auxiliary straightening vane is provided on each of the face side and the back side of the straightening vane.

In the cases of (2) to (5) above, it is possible to obtain a high straightening effect on the airflows in the air passage, to effectively suppress the generation of a negative-pressure zone in the air passage and the attendant passage resistance, and to further enhance the screen effect.

In addition, it is possible to increase the downward lift due to the running airflow pressure so as thereby to effectively obtain a down force exerted on the front wheel, and to obtain a further enhancement of the amenity in running.

(6). The present invention provides another windshield device provided at a front part of a vehicle body of a saddle ride type vehicle, including: an air introduction port provided at a front part of the windshield device and opened toward the front side of the vehicle; an air blow-off port provided at an upper part of the windshield device and opened toward the upper side; and an air duct establishing communication between the air introduction port and the air blow-off port, wherein at least a part of a front wall part of the air duct is in the shape of an inverted aerofoil having an upside-down aerofoil sectional shape.

According to the windshield device according to (6) above, the running airflow taken into the air duct through the air introduction port is blown off upwards through the air blow-off port, whereby the airflow inclusive of the surrounding running airflows can be so guided as to avoid the rider seated on the rear side of the windshield device. Therefore, a good screen effect for the rider can be obtained while suppressing the magnitude of the height of the windshield device (screen height).

In addition, where a part or the entire part of a front wall part of the air duct is the inverted aerofoil-like part, a downward lift due to an airflow passing along the air duct can be obtained. Therefore, it is possible to increase a down force exerted on a front part of the vehicle body, especially at the time of high-speed running, and thereby to obtain an enhanced amenity in running.

(7). The windshield device may have a configuration in which an outside surface of the wall part is provided with a projected part extending along an airflow.

In this case, it is possible to obtain a straightening effect on the airflow passing along the outside surface of the front wall part so as thereby to enhance the screen effect, and to make it difficult for the airflow passing along the outside surface of the front wall part to escape, so as thereby to efficiently obtain the down force.

(8). The windshield device may have a configuration in which the left-right width of the inverted aerofoil-like part is substantially equal to the left-right width of the air duct.

In this case, a large left-right width of the inverted aerofoil-like part can be secured, and the down force can be obtained more efficiently.

(9). The windshield device may have a configuration in which the air duct forms a plurality of air passages.

In this case, the airflow passing through the air duct can be straightened, and the down force can be thereby obtained efficiently.

In order to attain the above-mentioned second object, the present invention adopts the following means (10) to (16).

(10). The above-mentioned windshield device may have a configuration in which a water supplying part is provided for supplying water into an air passage in the air duct.

In this case, the running airflow passing through the air passage is cooled by the evaporation heat of water supplied into the air passage in the air duct. This running airflow (cool airflow) is appropriately supplied to the rider side, whereby a comfortable driving can be realized even when the outside air temperature is high, while obtaining the windshield effect for the rider.

(11). The windshield device may further include a water supply control device that permits the supply of water into the air passage to be controlled by the rider.

In this case, it is possible to control the presence or absence of the supply of water into the air passage and the like conditions and, hence, to control the temperature of the running airflow passing through the air passage, according to the rider's preference.

(12). The windshield device may have a configuration in which the air passage has a curved part; and the water supplying part is disposed at the curved part.

In this case, water can be supplied into a high flow rate zone (negative-pressure zone) at the curved part, whereby evaporation of water can be accelerated, and the running airflow can be cooled favorably.

(13). The windshield device may further include a water supplying device that supplies the water supplying part with water reserved in a water reserving part; and a control that controls the operation of the water supplying device.

In this case, it is possible to freely control the supply of water to the water supplying part and, hence, the supply of water into the air passage.

(14). The windshield device may have a configuration in which an air quantity detector that detects the quantity of a running airflow passing through the air passage is father provided; and the control controls the supply of water into the air passage according to detection data sent from the air quantity detector.

In this case, water can be appropriately supplied according to the quantity of air flowing through the air passage, and the running airflow can be cooled assuredly.

(15). The windshield device may further include: an opening control provided in the vicinity of an inlet of the air passage so as to control the opening of the air passage; an opening detector that detects the opening of the air passage at the opening control; a vehicle speed detector that detects the running speed of the saddle ride type vehicle; and a calculating device that calculates the quantity of the running airflow passing through the air passage, based on detection data sent from the opening detector and the vehicle speed detector, wherein the calculating device is used as the air quantity detector.

In this case, the quantity of the airflow guided to the rider side can be controlled according to the rider's preference, and water can be appropriately supplied according to the quantity of air, or the opening of the opening control, and the vehicle speed.

(16). The windshield device may have a configuration in which water is supplied into the air passage only when the value detected by the vehicle speed detector is within a predetermined range.

In this case, the supply of water into the air passage can be stopped at the time of low-speed running when evaporation of water fed from the water supplying part cannot be expected (when the quantity of the running airflow is small) or in the like situations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A and 4B, corresponding to FIG. 3, are illustration of operation of a windshield device in the motorcycle, wherein FIG. 4A shows the case where a straightening vane is present in an air duct, and FIG. 4B shows the case where the straightening vane is absent;

DETAILED DESCRIPTION OF THE PREFERRED EMBODIMENTS

Figure 1:
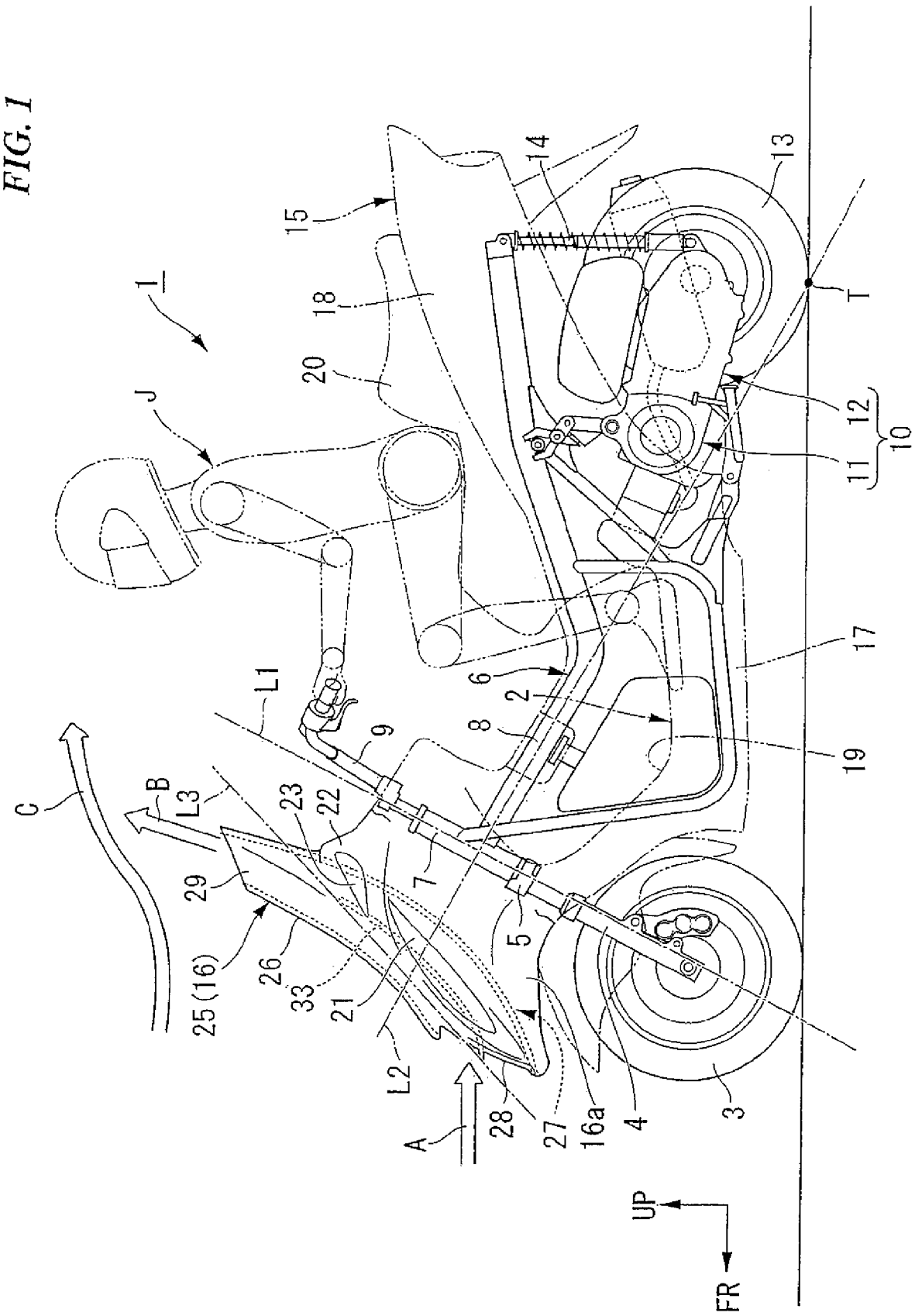
FIG. 1 is a left side view of a motorcycle in a first embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals. The front, rear, left and right sides and directions in the following description are the same sides and directions as those in the vehicle, unless otherwise specified. In addition, arrow FR in the drawings indicates the front side of the vehicle, arrow LH indicates the left side of the vehicle, and arrow UP indicates the upper side of the vehicle.

First Embodiment

A motorcycle 1 shown in FIG. 1 is a motor scooter type vehicle having a low-level floor 2, for example. A front wheel 3 is rotatably supported on a telescopic type front fork 4. The front fork 4 is steerably supported on a head pipe 7 at a front end part of a vehicle body frame 6 through a steering stem 5.

Symbol L1 in FIG. 1 identifies a steering turning axis (steering axis), which is also the center axis of the head pipe 7. An axis along the extending/contracting direction of the front fork 4 and the steering axis L1 are parallel to each other.

The vehicle body frame 6 has a main pipe 8 that extends rearwardly downwards from the head pipe 7, is then bent, and further extends rearwardly upwards. A steering handle 9 is attached to an upper end part of the steering stem 5.

A swing unit 10 is turnably supported on a rear part of the vehicle frame 6 so that it can swing about the front end side thereof. The swing unit 10 has an engine 11 and a power transmission mechanism 12 integral with each other. A rear wheel 13 as a drive wheel is mounted to an output shaft on the rear end side of the swing unit 10. A rear cushion 14 is disposed between a rear end part of the swing unit 10 and a rear end part of the vehicle body frame 6.

Symbol L2 in FIG. 1 identifies a steering orthogonal reference line which, in side view of the vehicle, is orthogonal to the steering axis L1 and extends to a grounding point T of the rear wheel 13. The straight line L2 substantially passes on the center axis of a front part of the main pipe 8.

The vehicle body frame 6 is covered with a body cover 15 composed mainly of a synthetic resin. The body cover 15 includes mainly a front cover 16 covering a front part of the vehicle frame 6 over the range from the front side to both lateral sides of the front part. An under cover 17 covers a lower part of the vehicle body frame 6 and is continuous with a lower part of the front cover 16. A rear cover 18 covers a rear part of the vehicle body frame 6. A floor cover 19 extends astride the main pipe 8 in the left-right direction and covers a portion ranging from a rear part of the front cover 16 to an upper part of the under cover 17.

On the upper side of the rear cover 18, a seat 20 for riders (the driver and the pillion passenger) is provided. The seat 20 can open and close a luggage box (not shown) inside the rear cover 18. The rider (driver) J seated on a front part of the seat 20 takes a driving posture in which he grips left and right grip parts of the steering handle 9 by his hands and puts his feet on left and right upper surfaces of the floor cover 19. In this instance, the front cover 16 is located on the front side of the rider J. The front cover 16 protects the rider J from the running airflow pressure.

Figure 2:
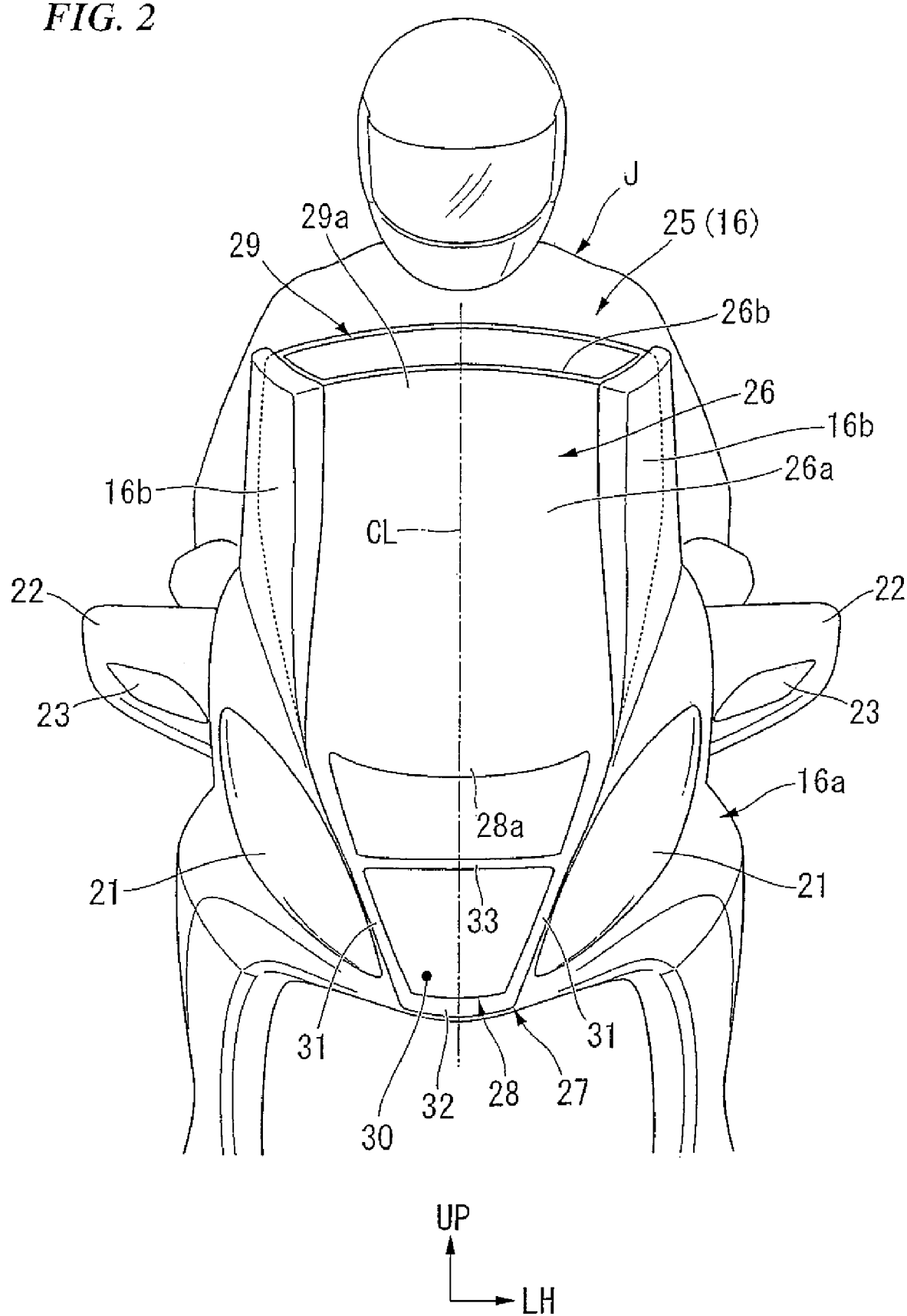
FIG. 2 is a front view of the motorcycle.

Referring to FIG. 2, a left-right pair of head lamps 21 are disposed in a mutually spaced state on both lateral sides of a front part of the front cover 16. The left-right pair of head lamps 21 extend in an inclined manner so as to be located on the rear upper sides as one goes toward the left and right outer sides along the outside surface of the front cover 16. A left-right pair of side-view mirrors 22 are attached to the left and right sides of the front cover 16. The left-right pair of side-view mirrors 22 project to the left and right outer sides so as to project to the front side of the left and right grip parts of the steering handle 9. The side-view mirrors 22 have respective casings, which become slenderer as one goes forwards. Left and right front winkers (blinkers or turn signals) 23 are disposed respectively at front parts of the casings. Line CL in FIG. 2 indicates the center line, passing through the center in the left-right direction of the vehicle body, of the motorcycle 1.

Figure 3:
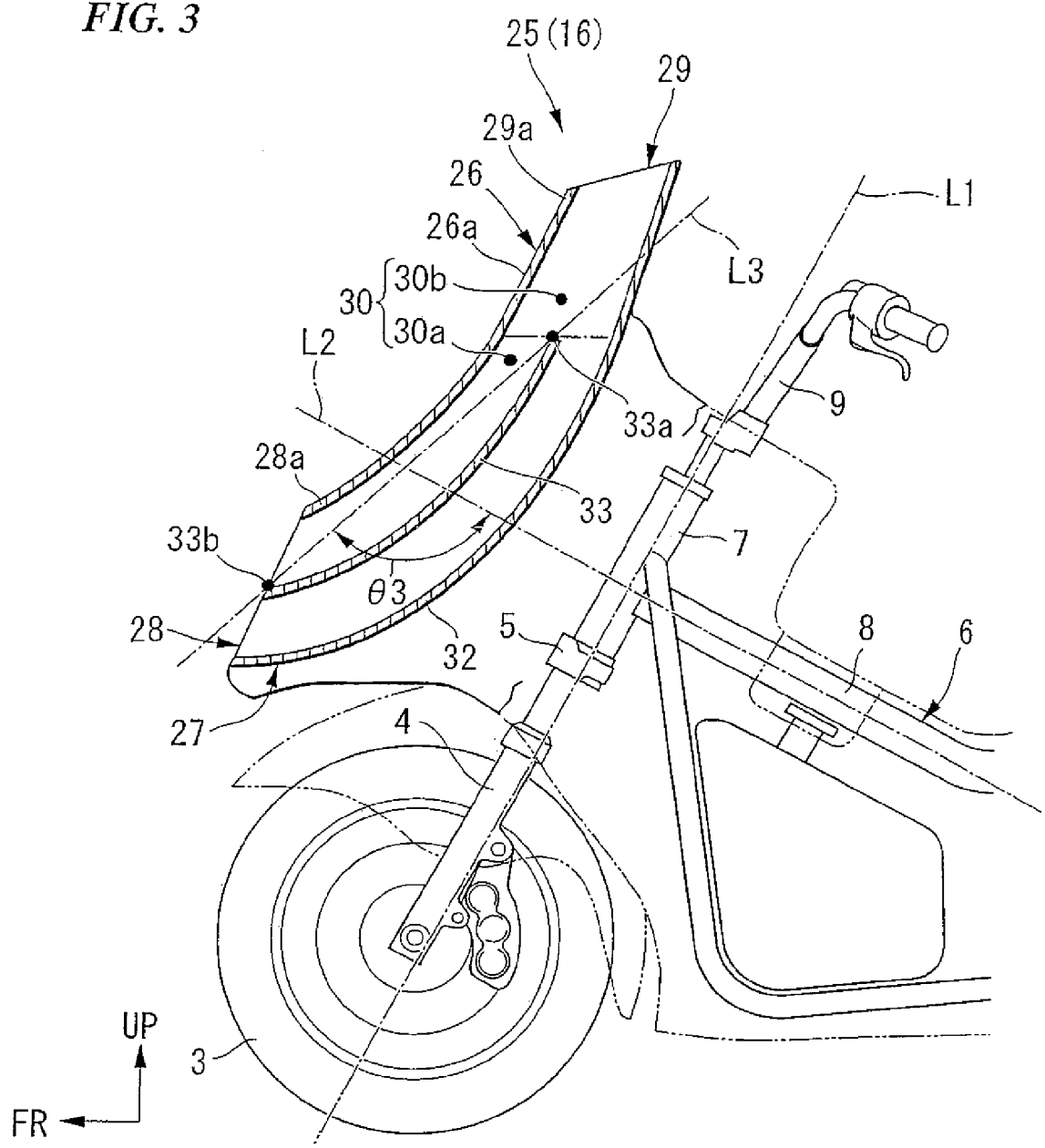
FIG. 3 is a partly sectional left side view of a front part of a vehicle body of the motorcycle.

Referring to FIG. 3, a portion, at an upper part and on the inner side in the left-right direction, of the front cover 16 is configured as a screen 25, which is formed from a transparent or translucent light-transmitting resin such as polycarbonate, for example. The screen 25 has a plate-like screen body 26 forming a rearwardly upwardly inclined front wall part (outside wall part) of an upper part of the front cover 16. An air duct 27 is provided so as to extend along the screen body 26 over the range from the lower side to the rear side of the screen body 26.

The air duct 27 has a predetermined thickness in the inside-outside direction of the front cover 16 (cover inside-outside direction), and is provided so as to enter to the back side of the screen body 26 (into the cover inside). The screen 25 is symmetrical on the left and right sides, and is disposed between both lateral parts of the front cover 16. The rider J can visually check the front side of the vehicle through the screen 25. The portion (cover body 16a), other than the screen 25, of the front cover 16 is formed from a colored opaque resin such as ABS resin, for example.

At a lower end part (front end part) of the screen 25, an air introduction port 28 for introducing air into the air duct 27 is opened toward the front side of the vehicle. At an upper end part of the screen 25, an air blow-off port 29 for blowing off the air coming from the air duct 27 is opened toward the upper side. The air introduction port 28 is located between the left and right head lamps 21 (in a central area in the left-right direction) at an upper end part of the front cover 16. The air blow-off port 29 is located to be present over the range from the left end to the right end of an upper edge part of the front cover 16. The height of the upper edge part of the screen 25 (the front cover 16) is set at such a level as not to shield the front-side field of vision of the rider J (at about the height of the rider's chest).

The air introduction port 28 is opened along a rearwardly upwardly inclined front end surface of the front cover 16, it is inverted trapezoid-shaped on the lower side in front view, and its upper edge part 28a is a curved shape that protrudes to the lower side. The screen body 26 is provided so as to rise up toward the upper rear side, with the upper edge part 28a of the air introduction port 28 as a lower edge part (front edge part) of the screen body 26. The screen body 26 is curved so as to be recessed toward the lower rear side (to protrude toward the cover inside) in side view. Air (running airflow) coming from the front side of the vehicle is received and guided toward the upper rear side along the outside surface (front surface) 26a of the screen body 26. Both lateral parts of the front cover 16 supporting both lateral sides of the screen 25 form curved surfaces 16b (see FIG. 2) turning around toward the rear side as one goes toward the left and right outer sides, whereby the running airflow coming from the front side of the vehicle is received and guided toward the rear side and the left and right outer sides.

The air blow-off port 29 has a horizontally elongate rectangular shape which is long in the left-right direction relative to the air introduction port 28 and which has a suppressed thickness in the cover inside-outside direction (here, the front-rear direction). The air blow-off port is opened along an upper end surface slightly inclined forwardly downwards at an upper edge part of the front cover 16. A front edge part 29a of the air blow-off port 29 is composed of an upper edge part of the screen body 26. Incidentally, it can be said that the air blow-off port 29 is provided to have a predetermined left-right width at a central part in the left-right direction of the upper edge part of the front cover 16.

The air duct 27 has a left-right pair of plate-like side wall parts 31 erected rearwards from both side edge parts of the screen body 26, a plate-like rear wall part 32 extending over the range between rear edge parts of the side edge wall parts 31, and a straightening vane 33 ranging between intermediate parts in the front-rear direction of the side wall parts 31. The rear wall part 32 is curved to protrude toward the lower rear side in side view so as to be along the screen body 26. The rear wall part 32, both the side wall parts 31 and the screen body 26 define an air passage 30 of the air duct 27, which extends rearwardly upwards along the screen body 26 in smooth continuation from the air introduction port 28 to the air blow-off port 29.

The left-right width of the upper edge part 28a of the air introduction port 28 is substantially equal to the left-right width of the front edge part 29a of the air blow-off port 29, and the left-right width of the screen body 26 is substantially constant over the range from the upper end to the lower end of the screen body 26. In addition, the left-right width of the screen body 26 is substantially equal to the entire left-right width of the air duct 27.

On the other hand, the left-right width of the rear wall part 32 at the air introduction port 28 is smaller than that at the air blow-off port 29. This is because the air introduction port 28 has an inverted trapezoid-shape. Therefore, the left-right width is reduced as one goes from the screen body 26 to the rear wall part 32, and the left-right width at the air blow-off port 29 is enlarged as one goes from the screen body 26 to the rear wall part 32. The left-right width of the air duct 27 reaches its maximum at the rear wall part 32 in the vicinity of the air blow-off port 29.

The left-right width (average left-right width) of the air passage 30 is varied smoothly and gradually to become greater along the direction from the air introduction port 28 side toward the air blow-off port 29 side. In addition, the thickness in the cover inside-outside direction of the air passage 30 is varied smoothly and gradually to become smaller along the direction from the air introduction port 28 side toward the air blow-off port 29 side. The sectional area, in a section orthogonal to the air flow direction, of the air passage 30 is substantially constant over the range from the air introduction port 28 to the air blow-off port 29.

As shown in FIG. 3, a lower part (front part) of the air passage 30 is a curved part 30a curved in side view so as to be inclined more steeply as one goes toward the rear side. An upper part of the air passage 30 is a rectilinear part 30b extending rectilinearly in side view toward the upper rear side. In the curved part 30a, a straightening vane 33 is provided, which is curved in side view so as to be along the screen body 26 and the rear wall part 32. Specifically, the straightening vane 33 is provided to extend from the air introduction port 28 to an upper end part of the curved part 30a (to an intermediate part of the air passage 30).

Symbol L3 in the figure identifies a straightening vane inclination reference line connecting the upper and lower ends 33a, 33b of the outside surface of the straightening vane 33 in side view of the vehicle.

Figure 4A:
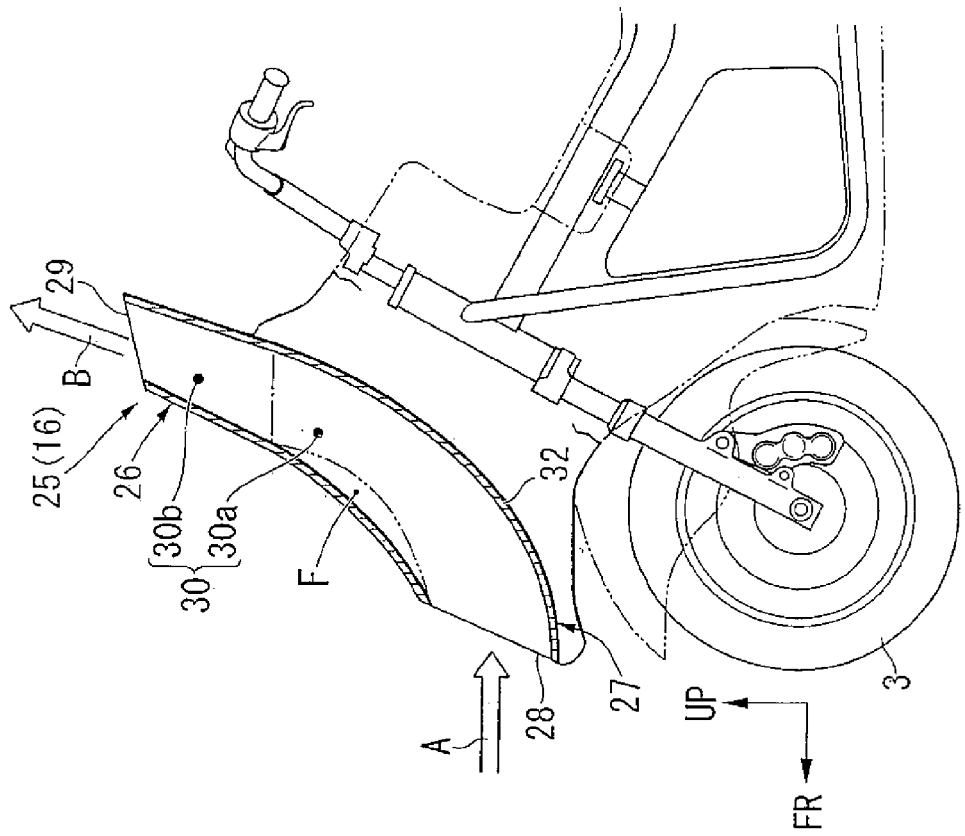
Figure 4B:
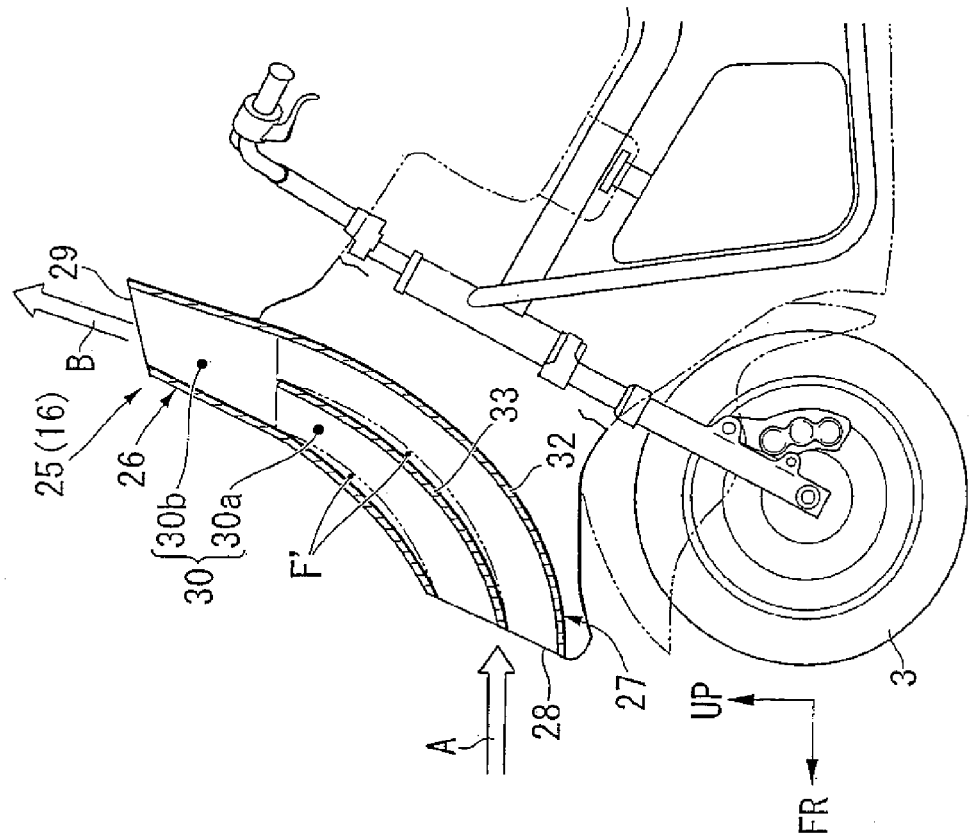

As shown in FIGS. 1, 4A and 4B, when the motorcycle 1 is running, a portion (see arrow A in the figures) of the running airflow passing substantially horizontally from the front side toward the rear side of the motorcycle 1 is taken into the air duct 27 through the air introduction port 28. The running airflow entering the air duct 27 is blown off from the air blow-off port 29 with an upward rearward orientation (see arrow B in the figures), with its flow direction being varied toward the rear upper side along the air passage 30.

In this instance, in the case where the straightening vane 33 is absent (see FIG. 4B), a comparatively large negative-pressure zone (low-pressure zone) F is generated on the back side of the screen body 26 in the curved part 30a of the air passage 30. On the other hand, with the straightening vane 33 provided especially in the curved part 30a (see FIG. 4A), only a small negative-pressure zone F' is generated on the back side of the screen body 26 and on the back side of the straightening vane 33. In other words, the straightening vane 33 not only produces a straightening effect on the running airflow passing through the air duct 27 (especially through the curved part 30a) but also reduces the negative-pressure zone in the air passage 30, thereby reducing the passage resistance. In addition, the straightening vane 33 contributes also to enhancement of the rigidity of the screen 25 as a whole.

The airflow blown off from the air blow-off port 29 acts to vary the flow direction of the running airflow passing over the screen 25 and tending to reach the rider J, toward the upper rear side (see arrow C in FIG. 1). As a result, the running airflows tending to pass toward the rider J can wholly be guided so as to avoid the rider J (namely, a good screen effect can be obtained) while suppressing the magnitude of the screen height. Incidentally, since the air blow-off port 29 is so provided as to range from the left end to the right end of the upper edge part of the front cover 16, the blow-off width of the running airflow passed through the air duct 27 is enlarged, whereby the range over which the screen effect is obtained is increased.

In side views of the vehicle shown in FIGS. 1 and 3, the straightening vane inclination reference line L3 is disposed to be rather tilted toward the road surface (set at an obtuse angle) than set orthogonal to the steering orthogonal reference line L2. Namely, the angle θ3 formed on the lower side (or the upper side) of the intersection between the straightening vane inclination reference line L3 and the steering orthogonal reference line L2 is set to be greater than 90 degrees. In other words, the straightening vane inclination reference line L3 is nearer to the horizontal than the steering axis L1 is.

A downward lift due to the running airflow pressure acts on the straightening vane 33 in a downward rearward direction, which is orthogonal to the straightening vane inclination direction (straightening vane inclination reference direction L3). However, since the straightening vane 33 is nearer to the horizontal than the steering axis L1 is, a downward component of force along the steering axis L1 can be included into the lift. As a result, a down force can be efficiently exerted on the front wheel 3, which enhances the running stability, especially at the time of high-speed running.

As has been described above, the windshield device in the first embodiment as above-described is the front cover 16 provided at a front part of the vehicle body of the motorcycle 1 so as to obtain a windshield effect for the rider J seated on the rear side thereof, including the air introduction port 28 provided at a front part of the front cover 16 and opened toward the front side of the vehicle, the air blow-off port 29 provided at an upper part of the front cover 16 and opened toward the upper side, and the air duct 27 establishing communication between the air introduction port 28 and the air blow-off port 29 through the rearwardly upwardly extending air passage 30, wherein the straightening vane 33 inclined rearwardly upwards along the air passage 30 is provided in the air passage 30, and, in side view of the vehicle, the straightening vane inclination reference line L3 connecting both ends of the straightening vane 33 is disposed at an obtuse angle in relation to the steering orthogonal reference line L2 being orthogonal to the steering axis L1 and reaching the grounding point T of the rear wheel 13.

This configuration ensures that the running airflow taken into the air duct 27 through the air introduction port 28 is blown off upwards from the air blow-off port 29, whereby the running airflow inclusive of the surrounding running airflows can be guided so as to avoid the rider J on the rear side of the front cover 16, and a good screen effect for the rider J can be obtained while suppressing the magnitude of the height of the front cover 16 (screen height).

In addition, with the straightening vane 33 provided in the air passage 30, it is possible to obtain a straightening effect on the airflow passing through the air passage 30, and to reduce the negative-pressure zone in the air passage 30, thereby reducing the passage resistance. Therefore, the screen effect can be further enhanced.

The straightening vane 33 is disposed at an obtuse angle in relation to the steering orthogonal reference line L2, whereby the running resistance due to the running airflow pressure can be lessened, and the downward lift exerted on the straightening vane 33 due to the running airflow pressure can be utilized as a down force exerted on the front wheel 3. Therefore, it is possible to obtain an enhanced amenity in running, especially at the time of high-speed running.

In addition, in the windshield device, the air passage 30 has the curved part 30a so curved as to be inclined more steeply as one goes toward the rear side in side view of the vehicle, and the straightening vane 33 being curved similarly to the curved part 30a is provided in the curved part 30a. As a result, it is possible to obtain a high straightening effect on the airflow passing through the air passage 30, and to effectively suppress the generation of the negative-pressure zone in the air passage 30 and the attendant passage resistance. Therefore, the screen effect can be further enhanced.

In addition, it is possible to increase the downward lift due to the running airflow pressure, thereby increasing the down force exerted on the front wheel 3, and to obtain a further enhancement of the amenity in running.

Incidentally, in the first embodiment above, a plurality of (appropriately, two) straightening vanes 33 may be provided in the air passage 30. In that case, the straightening vane inclination reference line connecting both ends of each of the straightening vanes 33 is disposed to be rather tilted toward the road surface than set orthogonal to the steering orthogonal reference line L2, in side view of the vehicle.

This configuration makes it possible to obtain a higher straightening effect and to reduce the passage resistance more effectively, by the plurality of straightening vanes 33. In addition, with lifts acting on the straightening vanes 33, it is possible to increase the down force exerted on the front wheel 3, and thereby to obtain a further enhancement of the amenity in running.

Second Embodiment

Now, a second embodiment of the present invention will be described below, referring to FIGS. 1 and 5.

A front cover 116 (screen 125) in this embodiment differs from that of the first embodiment above mainly in that a straightening vane 33' ranging continuously over the entire length of an air passage 30 (namely, ranging from an air introduction port 28 to an air blow-off port 29) is provided in place of the above-mentioned straightening vane 33. Auxiliary straightening vanes 34, 34' are provided in the air passage 30, respectively, on the face side and the back side of the straightening vane 33'. The same parts as those in the first embodiment above are identifies by the same symbols as used above, and descriptions of them will be omitted.

The straightening vane 33' is provided to extend from the air introduction port 28 to the air blow-off port 29, along a screen body 26 and a rear wall part 32. The straightening vane 33' bisects the entire space of the air passage 30 into an outside passage 30a' and an inside passages 30b'. The sectional area, in a section orthogonal to the air flow direction, of each of the outside and inside passages 30a', 30b' is substantially constant over the range from the air introduction port 28 to the air blow-off port 29.

In a curved part 30a of the air passage 30, the auxiliary straightening vanes 34, 34' curved in side view so as to extend along the screen body 26 and the rear wall part 32, respectively, are provided on the face side and the back side of the straightening vane 33', respectively. Specifically, the auxiliary straightening vanes 34, 34' are provided to range from the air introduction port 28 to an upper end part of the curved part 30a (to an intermediate part of the air passage 30).

Symbol L3' in the figure identifies a straightening vane inclination reference line, which connects the upper and lower ends 33a', 33b' of the outside surface of the straightening vane 33' in side view of the vehicle. Symbols L4 and L4' identify auxiliary straightening vane inclination reference lines, which each connect the upper and lower ends 34a, 34b or 34a', 34b' of the outside surface of either of the auxiliary straightening vanes 34, 34' in side view of the vehicle.

Figure 5:
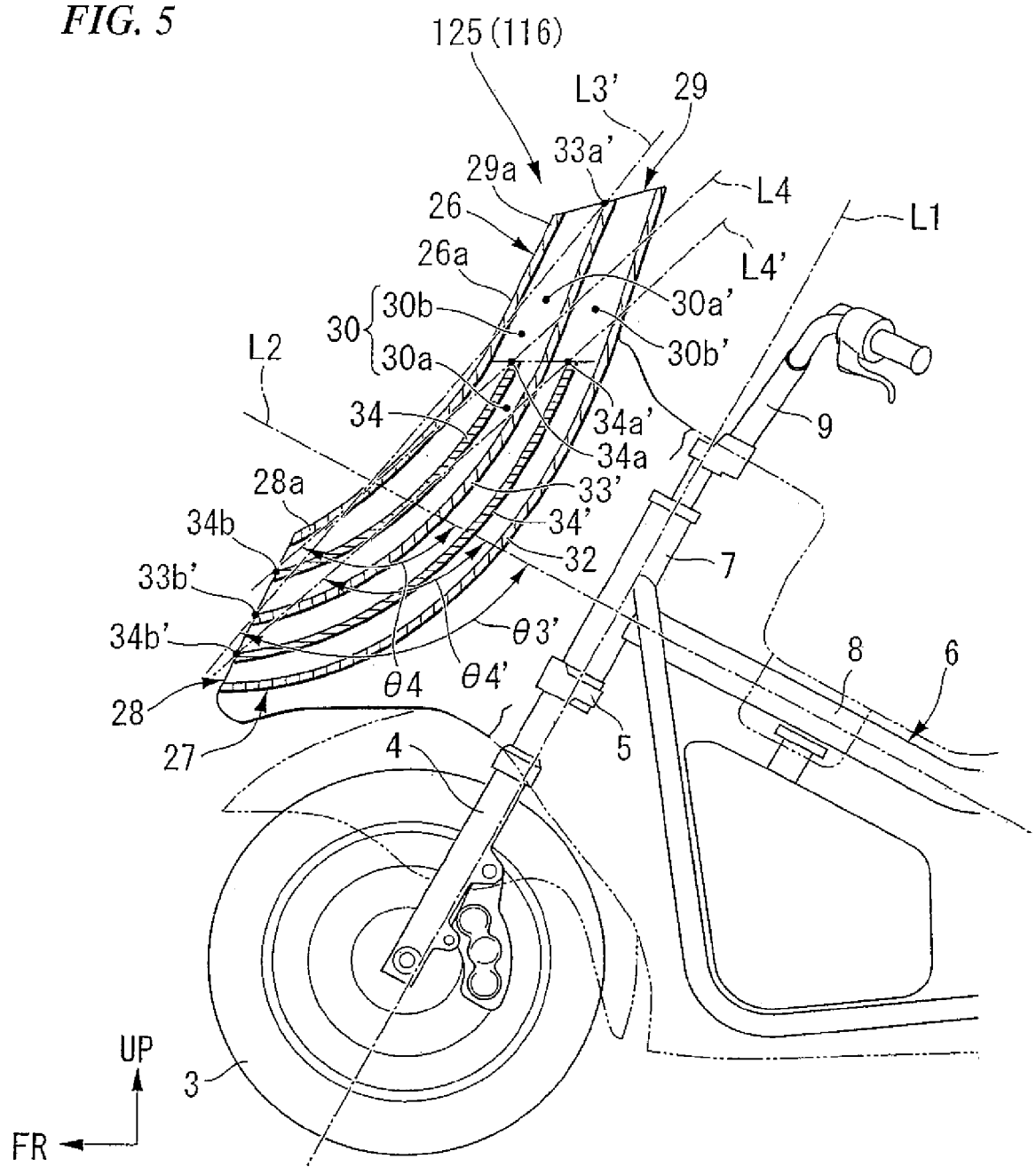
FIG. 5 is a left side view, corresponding to FIG. 3, of a second embodiment of the present invention.

In side view of the vehicle shown in FIG. 5, the straightening vane inclination reference line L3' and the auxiliary straightening vane inclination reference lines L4, L4' are disposed to be rather tilted toward the road surface (set at an obtuse angle) than set orthogonal to the steering orthogonal reference line L2. Namely, the angles θ3' and θ4, θ4' formed on the lower side (or the upper side) of the intersections at which the straightening vane inclination reference line L3' and the auxiliary straightening vane inclination reference lines L4, L4' intersect the steering orthogonal reference line L2 are greater than 90 degrees. In other words, the straightening vane inclination reference line L3' and the auxiliary straightening vane inclination reference lines L4, L4' are nearer to the horizontal than the steering axis L1 is.

As has been described above, the windshield device in the second embodiment has a configuration in which the straightening vane 33' is provided to be continuous over the range from the air introduction port 28 to the air blow-off port 29, the air passage 30 has the curved part 30a curved so as to be inclined more steeply as one goes toward the rear side, in side view of the vehicle, the auxiliary straightening vanes 34, 34' curved similarly to the curved part 30 a are provided in the curved part 30a and respectively on the face side and the back side of the straightening vane 33', and, in side view of the vehicle, the auxiliary straightening vane inclination reference lines L4, L4' respectively connecting both ends of the auxiliary straightening vanes 34, 34' are disposed at an obtuse angle in relation to the steering orthogonal reference line L2.

This configuration makes it possible to obtain a higher straightening effect on the airflow in the air passage 30, and to suppress the generation of the negative-pressure zone in the air passage 30 and the attendant passage resistance, thereby further enhancing the screen effect.

In addition, it is possible to further increase the downward lift arising from the running airflow pressure, thereby to further increase the down force exerted on the front wheel 3, and to obtain a further enhancement of the amenity in running.

Incidentally, in the second embodiment above, a configuration may be adopted in which the auxiliary straightening vane 34 or 34' is provided on only one of the face side and the back side of the straightening vane 33', according to the desired down force or the like factors. In addition, a plurality of the straightening vanes 33' may be provided.

In each of the embodiments above, the air duct 27, the air introduction port 28 and the air blow-off port 29 may be provided separately from the screen 25 or provided in a cover body 16a.

The configuration in each of the above-described embodiments is merely an example. The application of the present invention is naturally not limited to the application to a motor scooter type motorcycle, and various modifications are naturally possible within the scope of the present invention.

Third Embodiment

Now, a third embodiment of the present invention will be described below, referring to the drawings. The front, rear, left and right sides and directions in the following description are the same sides and directions as those in the vehicle, unless otherwise specified. In addition, arrow FR in the drawings indicates the front side of the vehicle, arrow LH indicates the left side of the vehicle, and arrow UP indicates the upper side of the vehicle.

Figure 6:
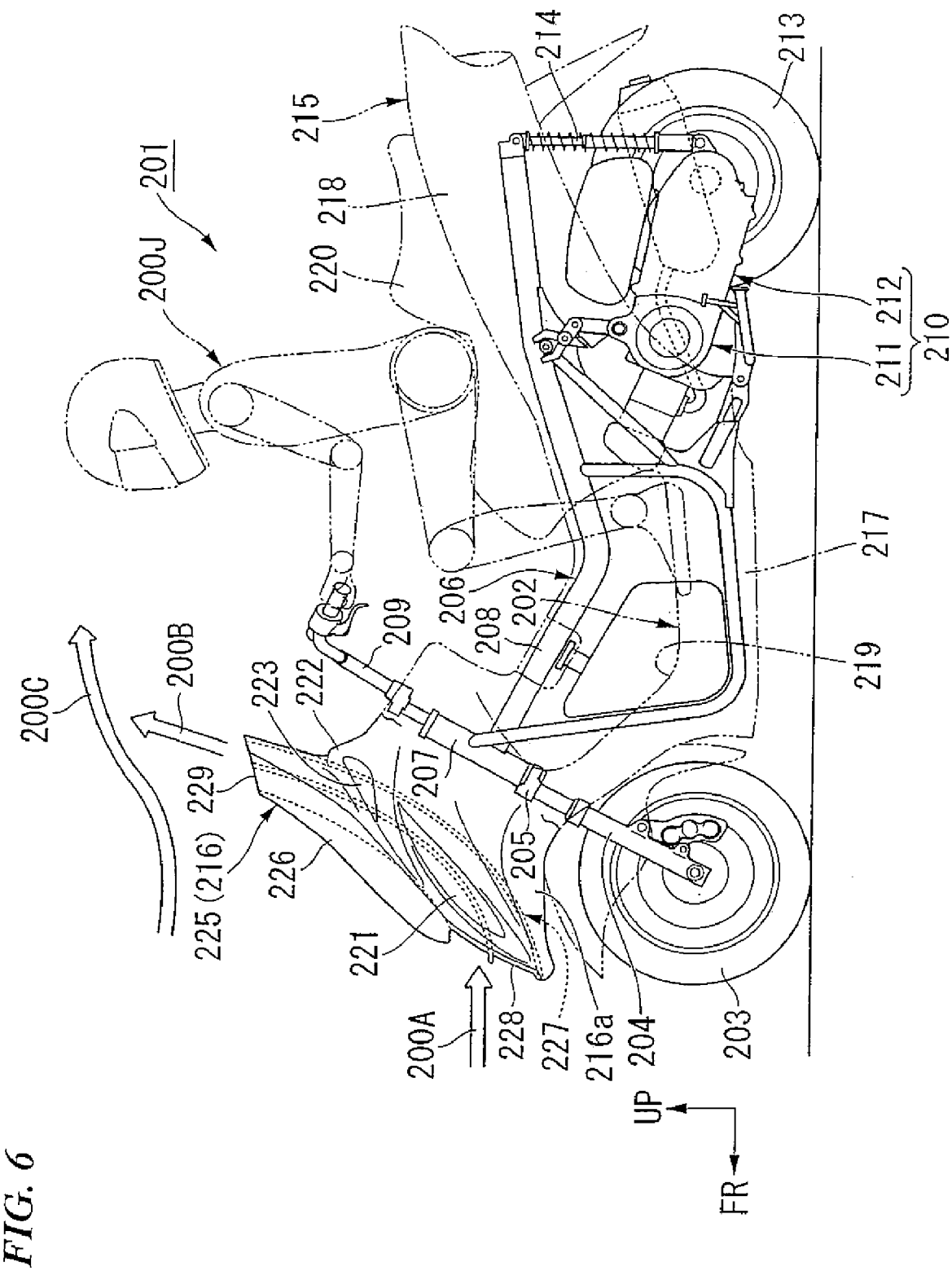
FIG. 6 is a left side view of a motorcycle in a third embodiment of the present invention.

A motorcycle 201 shown in FIG. 6 is a motor scooter type vehicle having a low-level floor 202, for example. A front wheel 203 is rotatably supported on a telescopic type front fork 204, and the front fork 204 is steerably supported on a head pipe 207 at a front end part of a vehicle body frame 206 through a steering stem 205. The vehicle body frame 206 has a main pipe that extends rearwardly downwards from the head pipe 207, is then bent, and further extends rearwardly upwards. A steering handle 209 is attached to an upper end part of the steering stem 205.

A swing unit 210 is turnably supported on a rear part of the vehicle frame 206 so that it can swing about the front end side thereof. The swing unit 210 has an engine 211 and a power transmission mechanism 212 integral with each other. A rear wheel 213 as a drive wheel is mounted to an output shaft on the rear end side of the swing unit 210. A rear cushion 214 is disposed between a rear end part of the swing unit 210 and a rear end part of the vehicle body frame 206.

The vehicle body frame 206 is covered with a body cover 215 composed mainly of a synthetic resin. The body cover 215 is composed mainly of a front cover 216 covering a front part of the vehicle frame 206 over the range from the front side to both lateral sides of the front part. An under cover 217 covers a lower part of the vehicle body frame 206 and is continuous with a lower part of the front cover 216. A rear cover 218 covers a rear part of the vehicle body frame 206. A floor cover 219 extends astride the main pipe 208 in the left-right direction and covers a portion ranging from a rear part of the front cover 216 to an upper part of the under cover 217.

In the upper side of the rear cover 218, a seat 220 for riders (the driver and the pillion passenger) is provided. The seat 220 can open and close a luggage box (not shown) inside the rear cover 218. The rider (driver) J seated on a front part of the seat 220 takes a driving posture in which he grips left and right grip parts of the steering handle 209 by his hands and puts his feet on left and right upper surfaces of the floor cover 219. In this instance, the front cover 216 is located on the front side of the rider 200J. The front cover 216 protects the rider 200J from the running airflow pressure.

Figure 7:
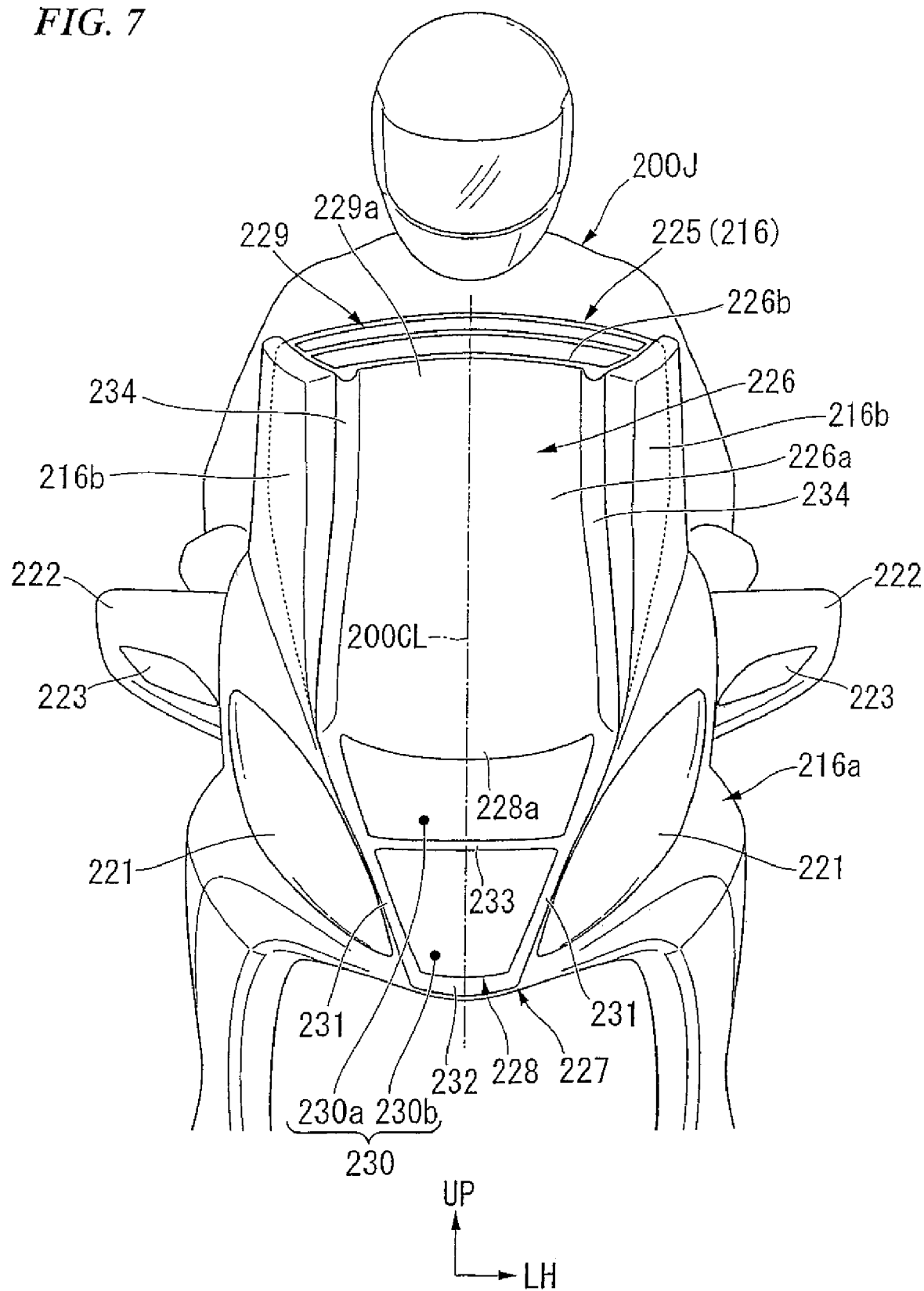
FIG. 7 is a front view of the motorcycle shown in FIG. 6.

Referring to FIG. 7, a left-right pair of head lamps 221 are disposed in a mutually spaced state on both lateral sides of a front part of the front cover 216. The left-right pair of head lamps 221 extend in an inclined manner so as to be located on the rear upper sides as one goes toward the left and right outer sides along the outside surface of the front cover 216. A left-right pair of side-view mirrors 222 are attached to the left and right sides of the front cover 216. The left-right pair of side-view mirrors 222 project to the left and right outer sides to the front side of the left and right grip parts of the steering handle 209. The side-view mirrors 222 each have respective casings which become slenderer as one goes forwards, and left and right front winkers (blinkers or turn signals) 223 are disposed respectively at front parts of the casings. Line 200CL in FIG. 7 indicates the center line, passing through the center in the left-right direction of the vehicle body, of the motorcycle 201.

Figure 8:
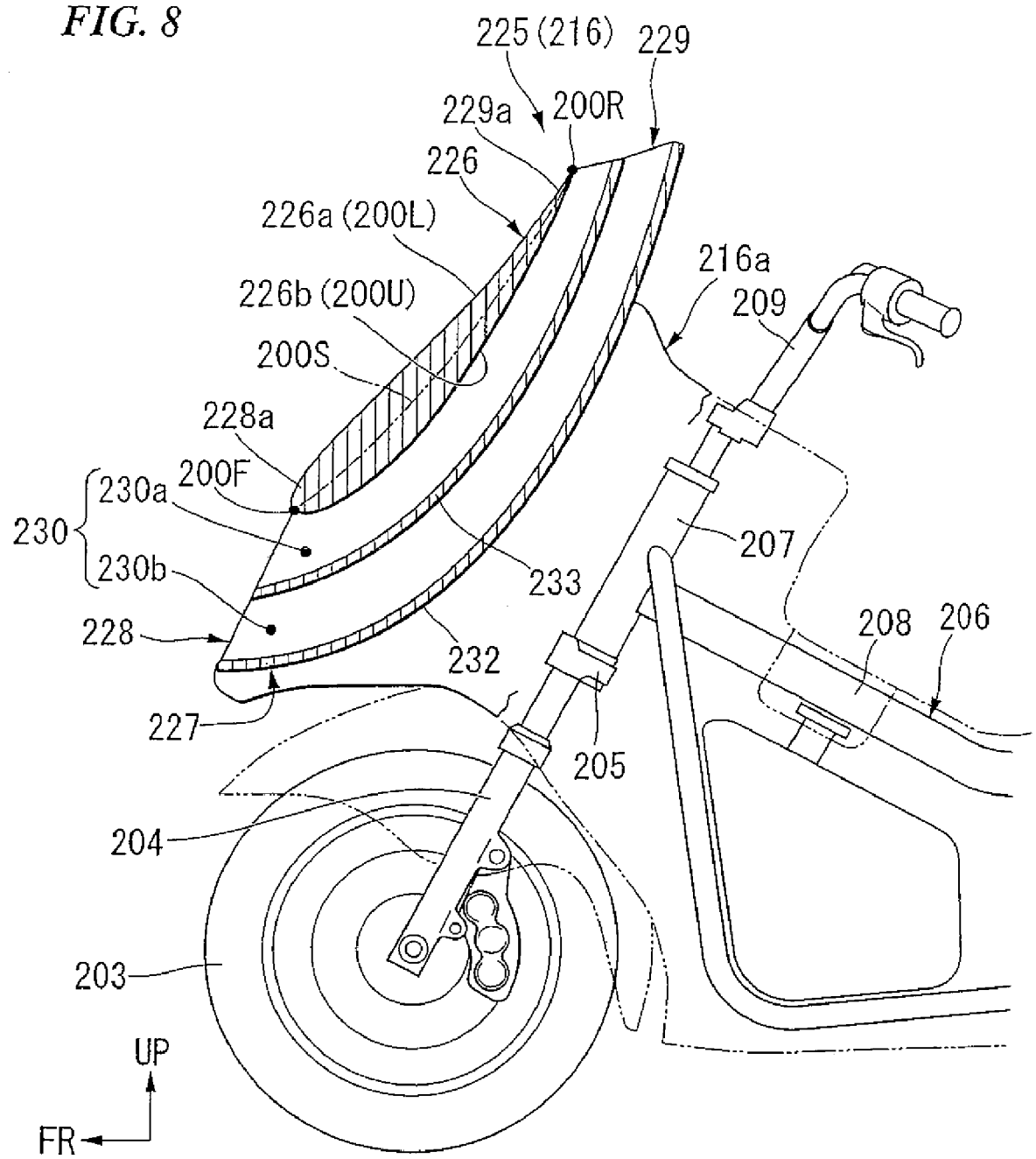
FIG. 8 is a partly sectional left side view of a front part of a vehicle body of the motorcycle shown in FIG. 6.

Referring to FIG. 8, a portion, at an upper part and on the inner side in the left-right direction, of the front cover 216 is configured as a screen 225, which is formed from a transparent or translucent light-transmitting resin such as polycarbonate. The screen 225 has a plate-like screen body 226 extending along generally a leftside-rightside direction forming a rearwardly upwardly inclined front wall part (outside wall part) of an upper part of the front cover 216. An air duct 227 is provided so as to extend along the screen body 226 over the range from the lower side to the rear side of the screen body 226.

The air duct 227 has a predetermined thickness in the inside-outside direction of the front cover 216 (cover inside-outside direction), and is provided so as to enter to the back side of the screen body 226 (into the cover inside). The screen 225 is symmetrical on the left and right sides, and is disposed between both lateral parts of the front cover 216. The rider 200J can visually check the front side of the vehicle through the screen 225. The portion (cover body 216a), other than the screen 225, of the front cover 216 is formed from a colored opaque resin such as ABS resin.

At a lower end part (front end part) of the screen 225, an air introduction port 228 for introducing air into the air duct 227 is opened toward the front side of the vehicle. At an upper end part of the screen 225, an air blow-off port 229 for blowing off the air coming from the air duct 227 is opened toward the upper side. The air introduction port 228 is located between the left and right head lamps 221 (in a central area in the left-right direction) at an upper end part of the front cover 216. The air blow-off port 229 is located to be present over the range from the left end to the right end of an upper edge part of the front cover 216. The height of the upper edge part of the screen 225 (the front cover 216) is set at such a level as not to shield the front-side field of vision of the rider 200J (at about the height of the rider's chest).

The air introduction port 228 is opened along a rearwardly upwardly inclined front end surface of the front cover 216, it is inverted trapezoid-shaped on the lower side in front view, and its upper edge part 228a is a curved shape that protrudes to the lower side. The screen body 226 is provided so as to rise up toward the upper rear side, with the upper edge part 228a of the air introduction port 228 as a lower edge part (front edge part) of the screen body 226. The screen body 226 is curved so as to be recessed toward the lower rear side (to protrude toward the cover inside) in side view, and air (running airflow) coming from the front side of the vehicle is received and guided toward the upper rear side along the outside surface (front surface) 226a of the screen body 226. Both lateral parts of the front cover 216 supporting both lateral sides of the screen 225 form curved surfaces 216b (see FIG. 7) turning around toward the rear side as one goes toward the left and right outer sides, whereby the running airflow coming from the front side of the vehicle is received and guided toward the rear side and the left and right outer sides.

The air blow-off port 229 has a horizontally elongate rectangular shape which is elongated in the left-right direction relative to the air introduction port 228 and which has a suppressed thickness in the cover inside-outside direction (the front-rear direction), and is opened along an upper end surface slightly inclined forwardly downwards at an upper edge part of the front cover 216. A front edge part 229a of the air blow-off port 229 is composed of an upper edge part of the screen body 226. It can be said that the air blow-off port 229 is provided to have a predetermined left-right width at a central part in the left-right direction of the upper edge part of the front cover 216.

The air duct 227 has a left-right pair of side wall parts 231 erected rearwards from both side edge parts of the screen body 226. A rear wall part 232 extends over the range between rear edge parts of the side edge wall parts 231. A straightening vane 233 ranges between intermediate parts in the front-rear direction of the side wall parts 231. The rear wall part 232 is curved to protrude toward the lower rear side in side view so as to be along the screen body 226. The rear wall part 232, both the side wall parts 231 and the screen body 226 define an air passage 230 of the air duct 227, which extends rearwardly upwards along the screen body 226 in smooth continuation from the air introduction port 228 to the air blow-off port 229.

The air passage 230 is bisected into an outside passage 230a and an inside passage 230b by a partition wall part 233 curved in side view so as to be along the screen body 226 and the rear wall part 232. The partition wall part 233 is provided over the range from the air introduction port 228 to the air blow-off port 229, and it not only produces a straightening effect on the airflow passing through the air duct 227 but also contributes to enhancement of the rigidity of the screen 225 as a whole.

The left-right width of the upper edge part 228a of the air introduction port 228 is substantially equal to the left-right width of the front edge part 229a of the air blow-off port 229. The left-right width of the screen body 226 is substantially constant over the range from the upper end to the lower end of the screen body 226. In addition, the left-right width of the screen body 226 is substantially equal to the entire left-right width of the air duct 227.

On the other hand, the left-right width of the rear wall part 232 and the partition wall part 233 at the air introduction port 228 is smaller than that at the air blow-off port 229, respectively. This is because the air introduction port 228 is so formed that the screen body 226, the partition wall part 233, and the rear wall part 232 are reduced in left-right width in this order, and the air blow-off port 229 is so formed that the screen body 226, the partition wall 233, and the rear wall part 232 are enlarged in left-right width in this order. The left-right width of the air duct 227 reaches its maximum at the rear wall part 232 in the vicinity of the air blow-off port 229.

Each of the outside and inside passages 230a, 230b in the air duct 227 is so formed that the left-right width (average left-right width) at an intermediate part in the cover inside-outside direction (front-rear direction) is varied smoothly and gradually to become larger as one goes from the air introduction port 228 side toward the air blow-off port 229 side. In addition, each of the outside and inside passages 230a, 230b is so formed that the thickness thereof in the cover inside-outside direction (front-rear direction) is varied smoothly and gradually to become smaller as one goes from the air introduction port 228 side toward the air blow-off port 229 side.

The sectional area, in a section orthogonal to the air flow direction, of each of the outside and inside passages 230a, 230b is substantially constant over the range from the air introduction port 228 to the air blow-off port 229. In order that the sectional areas of the outside and inside passages 230a, 230b are substantially equal, the thickness in the cover inside-outside direction of the comparatively larger-width outside passage 230a is set to be slightly smaller than that of the inside passage 230b on the side of the air introduction port 228, whereas the thickness in the cover inside-outside direction of the comparatively smaller-width outside passage 230a is set to be slightly larger than that of the inside passage 230b on the side of the air blow-off port 229.

When the motorcycle 201 having the front cover 216 configured as above is running, a portion (see arrow 200A in the FIG. 6) of the running airflow passing substantially horizontally from the front side toward the rear side of the motorcycle 201 is taken into the air duct 227 through the air introduction port 228. The running airflow entering the air duct 227 is blown off from the air blow-off port 229 with an upward rearward orientation (see arrow 200B in FIG. 6), with its flow direction being varied toward the rear upper side along the air passage 230.

The airflow blown off from the air blow-off port 229 acts to vary the flow direction of the running airflow passing over the screen 225 and tending to reach the rider 200J, toward the upper rear side (see arrow 200C in FIG. 6). As a result, the running airflows tending to pass toward the rider 200J can wholly be guided so as to avoid the rider 200J (namely, a good screen effect can be obtained) while suppressing the magnitude of the screen height.

On the outside surface 226a side of both side edge parts of the screen body 226, projected parts 234 are provided in a circular bead-like shape, for example. The projected parts 234 extend over the range from the upper end to the lower end of the side edge parts (see FIG. 7). Both of the projected parts 234 produce a straightening effect on the running airflow passing on the outside surface 226a of the screen body 226, so that the screen effect can be obtained also by the running airflow.

In addition, by the straightening effect of the partition wall in the air duct 227, the running airflow in the air duct 227 can be favorably blown off from the air blow-off port 229, whereby the screen effect can be enhanced.

Furthermore, since the air blow-off port 229 is provided so as to range from the left end to the right end of an upper edge part of the front cover 216, the blow-off width of the running airflow having passed through the air duct 227 is enlarged, whereby the range over which the screen effect is obtained can be increased.

Figure 9:
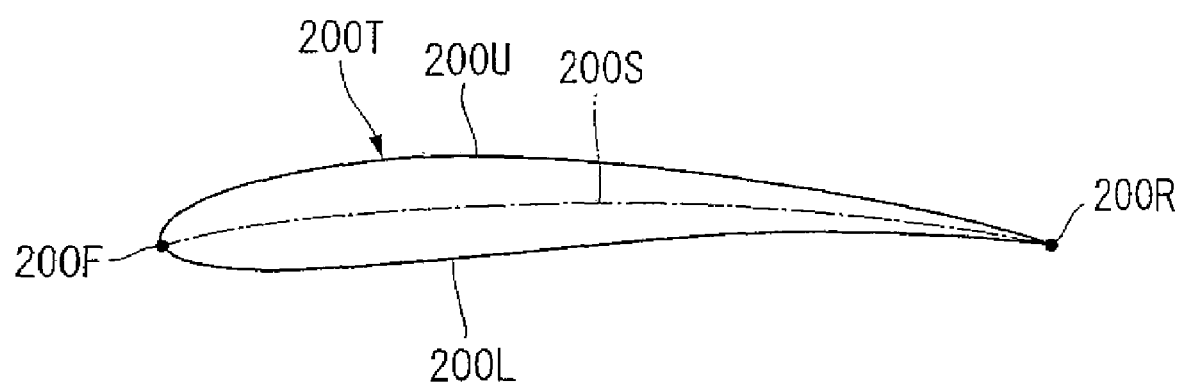
FIG. 9 is an illustration of an aerofoil applied to a windshield device in the motorcycle shown in FIG. 6.

As shown in FIG. 8, the screen body 226 is configured so as to have a generally upside-down aerofoil-like (inverted aerofoil-like) shape in section orthogonal to the left-right direction. More specifically, like the general Joukowski's wing 200T shown in FIG. 9, the sectional shape of the screen body 206 is a teardrop shape (streamline shape), which is like a curved line on the leading edge 200F side and extends in an elongate sharp shape on the trailing edge 200R side. The screen body 226, having an upper wing surface (a protruded curved surface) 200U as an inside surface 226b on the inside of the cover (the inside of the air duct 227) and having a lower wing surface (a recessed curved surface or a flat surface) 200L as an outside surface 226a on the outside of the cover (the outside of the air duct 227), is disposed at a predetermined inclination angle. In this case, a center line 200S connecting the central points in the thickness direction in sectional view of the screen body 226 (aerofoil) assumes a curved shape that protrudes to the inside of the cover. Of the screen body 226 (aerofoil), a leading edge part is located at an upper edge part 228a of the air introduction port 228, while a trailing edge part is located at a front edge part 229a of the air blow-off port 229.

With the screen body 226 thus formed in an inverted aerofoil shape in section, airflows passing along the outside and inside surfaces 226a, 226b of the screen body 226 are generated, whereby a lift in a downwardly rearward direction orthogonal to the inclination direction of the screen body 226 can be generated in the screen body 226. More specifically, the velocity of the running airflow passing along the inside surface (the upper wing surface 200U) of the screen body 226 becomes higher, as compared with the running airflow passing along the outside surface 226a (the lower wing surface 200L) of the screen body 226, the pressure on the inside surface 226b of the screen body 226 is lowered, as compared with the pressure on the outside surface 226a of the screen body 226, and this pressure difference produces a downwardly rearward lift in the screen body 226. A downward component of the lift force serves mainly as a down force exerted on the front wheel 203 (a vertical load on the front wheel), which enhances the running stability, especially at the time of high-speed running. In addition, with the screen body 226 being aerofoil-like, or streamline-like, in section, the flow resistance to the running airflow passing along the screen body 226 is suppressed, which contributes to a reduction in the running resistance to the motorcycle 201.

As has been described above, the windshield device in the embodiment as above-described is the front cover 216 provided at a front part of the vehicle body of the motorcycle 201 so as to obtain a windshield effect for the rider 200J on the rear side thereof, including the air introduction port 228 provided at a front part of the front cover 216 and opened toward the front side of the vehicle, the air blow-off port 229 provided at an upper part of the front cover 216 and opened toward the upper side, and the air duct 227 establishing communication between the air introduction port 228 and the air blow-off port 229. Further, in this windshield device, the screen body 226 forming a part of the air duct 227 is an inverted aerofoil-like body which has an upside-down aerofoil-like shape in section.

This configuration ensures that the running airflow taken into the air duct 227 through the air introduction port 228 is blown off upwards from the air blow-off port 229, whereby the running airflow inclusive of the surrounding running airflows can be so guided as to avoid the rider 200J on the rear side of the front cover 216. As a result, a good screen effect for the rider 200J can be obtained while suppressing the magnitude of the height of the front cover (screen height).

In addition, the screen body 226 forming a part of the air duct 227 is formed to be inverted aerofoil-like in sectional shape, whereby a downward lift can be obtained from the airflow passing along the air duct 227. Therefore, especially at the time of high-speed running, the down force exerted on a front part of the vehicle body can be increased, thereby contriving an enhanced amenity in running.

In this windshield device, the projected parts 234 extending along the airflow are provided on the outside surface 226a of the screen body 226. This makes it possible to obtain a straightening effect on the airflow passing along the outside surface 226a of the screen 226, thereby enhancing the screen effect, and to make it difficult for the airflow passing along the outside surface 226a of the screen body 226 to escape, so as thereby to efficiently obtain the down force.

Further, in the windshield device as above, the left-right width of the inverted aerofoil-like screen body 226 is set to be substantially equal to the left-right width of the air duct 227, whereby it is possible to secure a large left-right width of the screen body 226, and to obtain the down force more efficiently.

Moreover, in the windshield device as above, the air duct 227 is made to form a plurality of air passages (the outside and inside passages 230a and 230b), whereby it is possible to straighten the airflow passing through the air duct 227, and to efficiently obtain the down force.

The present invention is not limited to the above embodiments. For example, a configuration may be adopted in which the screen body 226 is not inverted aerofoil-like over the entire width thereof, but is provided at a part thereof with an inverted aerofoil-like part having an inverted aerofoil-like sectional shape. In this case, the range over which the inverted aerofoil-like sectional shape is provided may be appropriately determined according to the magnitude of the down force desired. In other words, the left-right width of the inverted aerofoil-like part may be different from the left-right width of the air duct 227. In addition, the wall part (the partition wall part 233 or the rear wall part 232, or the like), other than the screen body 226, of the air duct may be provided with an inverted aerofoil-like part.

In addition, the air duct 227, the air introduction port 228 and the air blow-off port 229 may be provided separately from the screen 225 or provided in a cover body 216*a*.

The configuration in each of the above-described embodiments is merely an example. The application of the present invention is naturally not limited to the application to a motor scooter type motorcycle, and various modifications are naturally possible within the scope of the gist of the present invention.

Fourth Embodiment

Now, a fourth embodiment of the present invention will be described below, referring to the drawings. The front, rear, left and right sides and directions in the following description are the same sides and directions as those in the vehicle, unless otherwise specified. In addition, arrow FR in the drawings indicates the front side of the vehicle, arrow LH indicates the left side of the vehicle, and arrow UP indicates the upper side of the vehicle.

Figure 10:
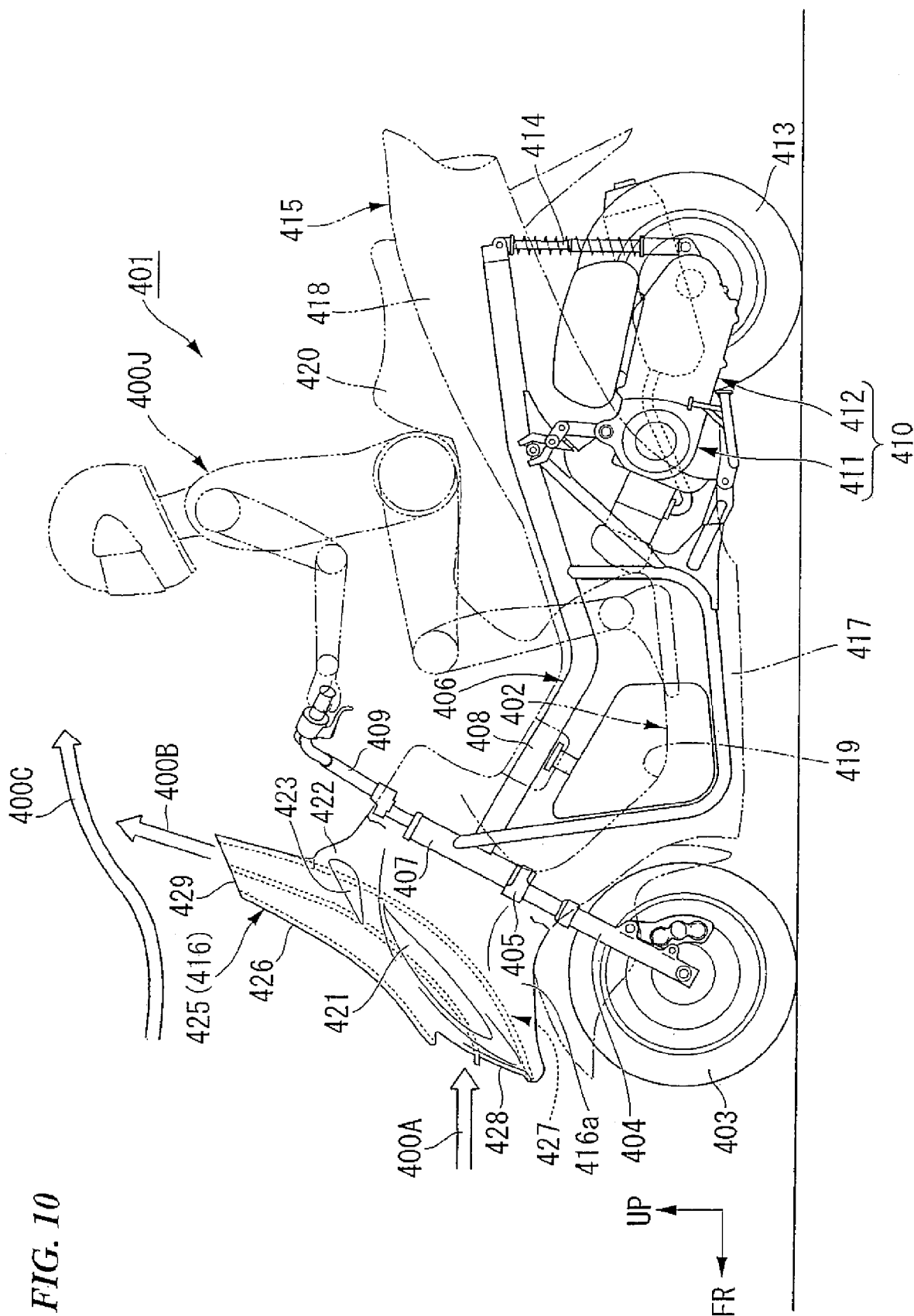
FIG. 10 is a left side view of a motorcycle in a fourth embodiment of the present invention.

A motorcycle 401 shown in FIG. 10 is a motor scooter type vehicle having a low-level floor 402, for example. A front wheel 403 is rotatably supported on a telescopic type front fork 404, and the front fork 404 is steerably supported on a head pipe 407 at a front end part of a vehicle body frame 406 through a steering stem 405. The vehicle body frame 406 has a main pipe 408 that extends rearwardly downwards from the head pipe 407, is then bent, and further extends rearwardly upwards. A steering handle 409 is attached to an upper end part of the steering stem 405.

A swing unit 410 is turnably supported on a rear part of the vehicle frame 406 so that it can swing about the front end side thereof. The swing unit 410 has an engine 411 and a power transmission mechanism 412 integral with each other. A rear wheel 413 as a drive wheel is mounted to an output shaft on the rear end side of the swing unit 410. A rear cushion 414 is disposed between a rear end part of the swing unit 410 and a rear end part of the vehicle body frame 406.

The vehicle body frame 406 is covered with a body cover 415 composed mainly of a synthetic resin. The body cover 415 includes mainly a front cover 416 covering a front part of the vehicle frame 406 over the range from the front side to both lateral sides of the front part. An under cover 417 covers a lower part of the vehicle body frame 406 and is continuous with a lower part of the front cover 416. A rear cover 418 covers a rear part of the vehicle body frame 406. A floor cover 419 extends astride the main pipe 408 in the left-right direction and covers a portion ranging from a rear part of the front cover 416 to an upper part of the under cover 417.

On the upper side of the rear cover 418, a seat 420 for riders (the driver and the pillion passenger) is provided. The seat 420 can open and close a luggage box (not shown) inside the rear cover 418. The rider (driver) 400J seated on a front part of the seat 420 takes a driving posture in which he grips left and right grip parts of the steering handle 409 by his hands and puts his feet on left and right upper surfaces of the floor cover 419. In this instance, the front cover 416 is located on the front side of the rider 400J. The front cover 416 protects the rider 400J from the running airflow pressure.

Figure 11:
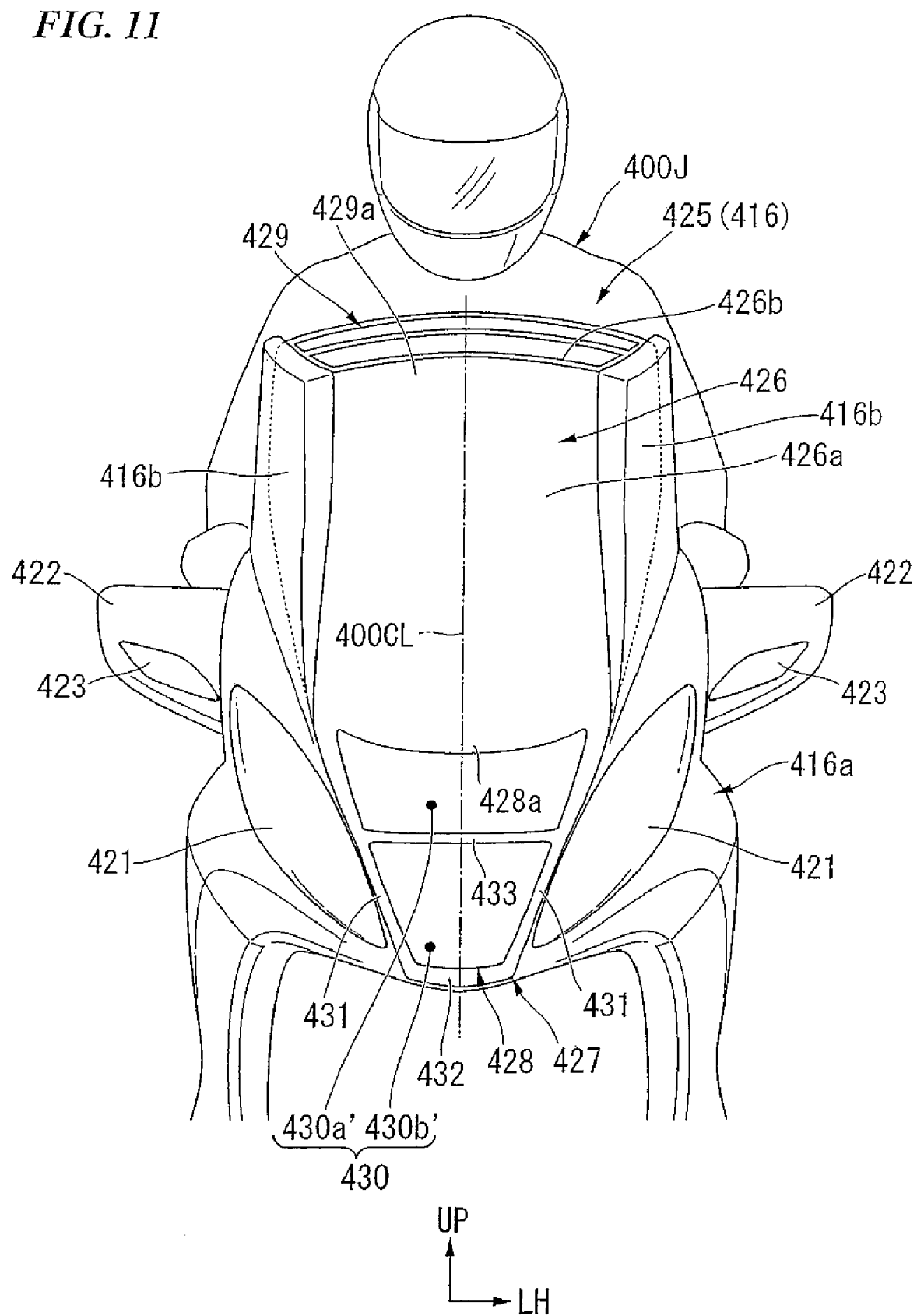
FIG. 11 is a front view of the motorcycle shown in FIG. 10.

Referring to FIG. 11, on both lateral sides of a front part of the front cover 416, a left-right pair of head lamps 421 extend in an inclined manner so as to be located on the rear upper sides as one goes toward the left and right outer sides along the outside surface of the front cover 416 are disposed in a mutually spaced state. A left-right pair of side-view mirrors 422 are attached to the left and right sides of the front cover 416. The left-right pair of side-view mirrors 422 project to the left and right outer sides to the front side of the left and right grip parts of the steering handle 409. The side-view mirrors 422 each have respective casings which become slenderer as one goes forwards. Left and right front winkers (blinkers or turn signals) 423 are disposed respectively at front parts of the casings. Line 400CL in FIG. 11 indicates the center line, passing through the center in the left-right direction of the vehicle body, of the motorcycle 401.

Figure 12:
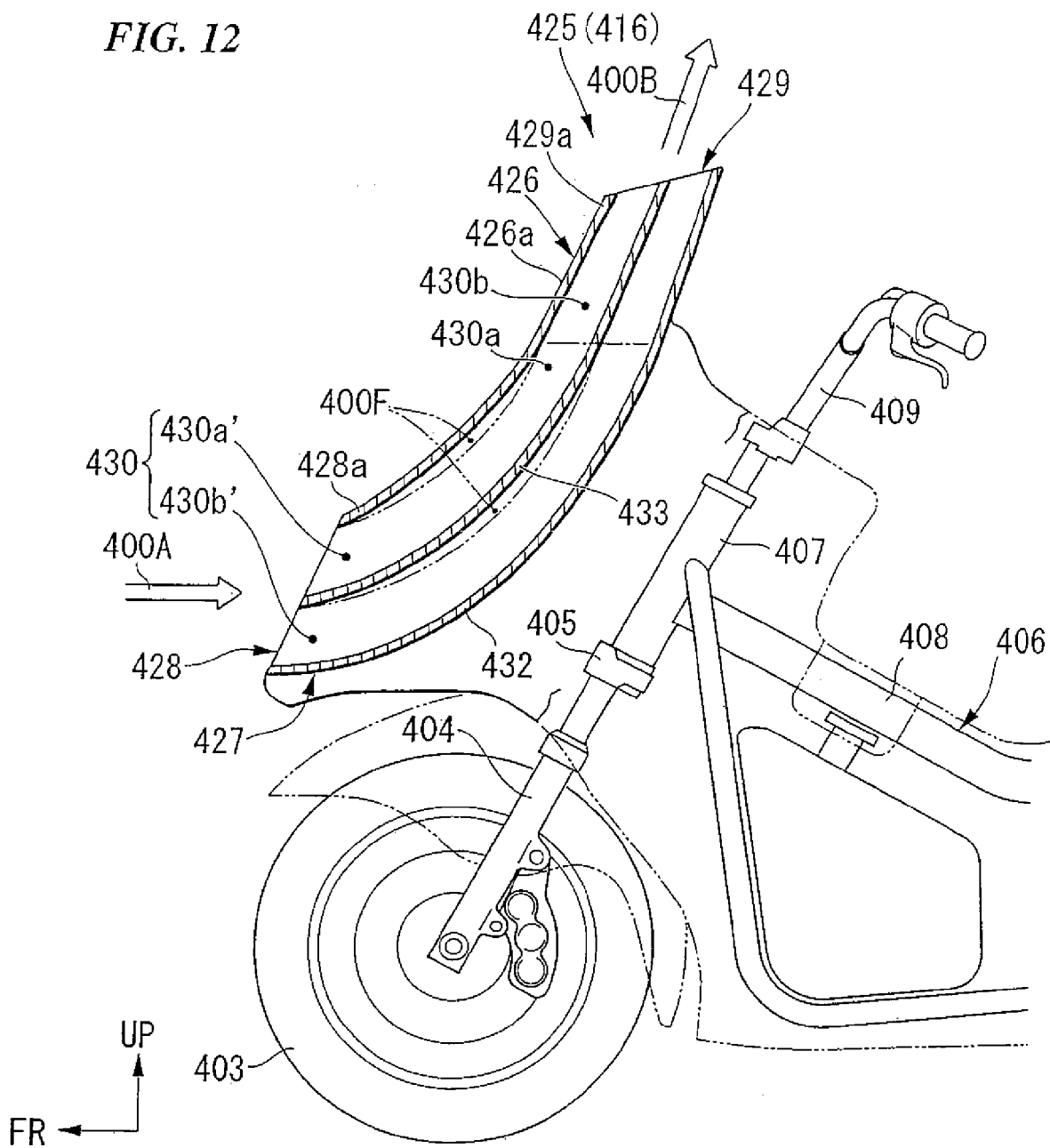
FIG. 12 is a partly sectional left side view of a front part of a vehicle body of the motorcycle shown in FIG. 10.

Referring to FIG. 12, a portion, at an upper part and on the inner side in the left-right direction, of the front cover 416 is configured as a screen 425, which is formed from a transparent or translucent light-transmitting resin such as polycarbonate, for example. The screen 425 has a plate-like screen body 426 extending generally along left-right direction forming a rearwardly upwardly inclined front wall part (outside wall part) of an upper part of the front cover 416, and an air duct 427 so provided as to extend along the screen body 426 over the range from the lower side to the rear side of the screen body 426.

The air duct 427 has a predetermined thickness in the inside-outside direction of the front cover 416 (cover inside-outside direction), and is provided so as to enter to the back side of the screen body 426 (into the cover inside). The screen 425 is symmetrical on the left and right sides, and is disposed between both lateral parts of the front cover 416. The rider 400J can visually check the front side of the vehicle through the screen 425. The portion (cover body 416*a*), other than the screen 425, of the front cover 416 is formed from a colored opaque resin such as ABS resin, for example.

At a lower end part (front end part) of the screen 425, an air introduction port 428 for introducing air into the air duct 427 is opened toward the front side of the vehicle. Also, at an upper end part of the screen 425, an air blow-off port 429 for blowing off the air coming from the air duct 427 is opened toward the upper side. The air introduction port 428 is located between the left and right head lamps 421 (in a central area in the left-right direction) at an upper end part of the front cover 416. The air blow-off port 429 is located to be present over the range from the left end to the right end of an upper edge part of the front cover 416. The height of the upper edge part of the screen 425 (the front cover 416) is set at such a level as not to shield the front-side field of vision of the rider 400J (at about the height of the rider's chest).

The air introduction port 428 is opened along a rearwardly upwardly inclined front end surface of the front cover 416, it is inverted trapezoid-shaped on the lower side in front view, and its upper edge part 428*a* is a curved shape that protrudes to the lower side. The screen body 426 is provided so as to rise up toward the upper rear side, with the upper edge part 428*a* of the air introduction port 428 as a lower edge part (front edge part) of the screen body 426. The screen body 426 is curved so as to be recessed toward the lower rear side (to protrude toward the cover inside) in side view. Air (running airflow) coming from the front side of the vehicle is received and guided toward the upper rear side along the outside surface (front surface) 426*a* of the screen body 426. Both lateral parts of the front cover 416 supporting both lateral sides of the screen 425 form curved surfaces 416b (see FIG. 11) turning around toward the rear side as one goes toward the left and right outer sides, whereby the running airflow coming from the front side of the vehicle is received and guided toward the rear side and the left and right outer sides.

The air blow-off port 429 has a horizontally elongate rectangular shape which is elongate in the left-right direction relative to the air introduction port 428 and which has a suppressed thickness in the cover inside-outside direction (the front-rear direction), and is opened along an upper end surface slightly inclined forwardly downwards at an upper edge part of the front cover 416. A front edge part 429a of the air blow-off port 429 is composed of an upper edge part of the screen body 426. It can be said that the air blow-off port 429 is provided to have a predetermined left-right width at a central part in the left-right direction of the upper edge part of the front cover 416.

The air duct 427 has a left-right pair of side wall parts 431 erected rearwards from both side edge parts of the screen body 426, a rear wall part 432 extending over the range between rear edge parts of the side edge wall parts 431, and a straightening vane 433 ranging between intermediate parts in the front-rear direction of the side wall parts 431. The rear wall part 432 is curved to be protuberant toward the lower rear side in side view so as to be along the screen body 426. The rear wall part 432, both the side wall parts 431 and the screen body 426 define an air passage 430 of the air duct 427, which extends rearwardly upwards along the screen body 426 in smooth continuation from the air introduction port 428 to the air blow-off port 429.

The air passage 430 is bisected into an outside passage 430a' and an inside passage 430b' by a partition wall part 433 curved in side view so as to be along the screen body 426 and the rear wall part 432. The partition wall part 433 is provided over the range from the air introduction port 428 to the air blow-off port 429, and it not only produces a straightening effect on the airflow passing through the air duct 427 but also contributes to enhancement of the rigidity of the screen 425 as a whole.

The left-right width of the upper edge part 428a of the air introduction port 428 is substantially equal to the left-right width of the front edge part 429a of the air blow-off port 429, and the left-right width of the screen body 426 is substantially constant over the range from the upper end to the lower end of the screen body 426. In addition, the left-right width of the screen body 426 is substantially equal to the entire left-right width of the air duct 427.

On the other hand, the left-right width of the rear wall part 432 and the partition wall part 433 at the air introduction port 428 is smaller than that at the air blow-off port 429, respectively. This is because the air introduction port 428 is so formed that the screen body 426, the partition wall part 433, and the rear wall part 432 are reduced in left-right width in this order, and the air blow-off port 429 is so formed that the screen 426, the partition wall 433, and the rear wall part 432 are enlarged in left-right width in this order. The left-right width of the air duct 427 reaches its maximum at the rear wall part 432 in the vicinity of the air blow-off port 429.

Each of the outside and inside passages 430a', 430b' in the air duct 427 is so formed that the left-right width (average left-right width) at an intermediate part in the cover inside-outside direction (front-rear direction) is varied smoothly and gradually to become larger as one goes from the air introduction port 428 side toward the air blow-off port 429 side. In addition, each of the outside and inside passages 430a', 430b' is so formed that the thickness thereof in the cover inside-outside direction (front-rear direction) is varied smoothly and gradually to become smaller as one goes from the air introduction port 428 side toward the air blow-off port 429 side.

The sectional area, in a section orthogonal to the air flow direction, of each of the outside and inside passages 430a', 430b' is substantially constant over the range from the air introduction port 428 to the air blow-off port 429. In order that the sectional areas of the outside and inside passages 430a', 430b' are substantially equal, the thickness in the cover inside-outside direction of the comparatively larger-width outside passage 430a' is set to be slightly smaller than that of the inside passage 430b' on the side of the air introduction port 428, whereas the thickness in the cover inside-outside direction of the comparatively smaller-width outside passage 430a' is set to be slightly larger than that of the inside passage 430b' on the side of the air blow-off port 429.

As shown in FIG. 12, a lower part (front part) of the air passage 430 is a curved part 430a curved in side view so as to be inclined more steeply as one goes toward the rear side. An upper part of the air passage 430 is a rectilinear part 430b extending rectilinearly in side view toward the upper rear side.

Referring to FIG. 10, when the motorcycle 401 having the above-mentioned front cover 416 is running, a portion (see arrow 400A in the figures) of the running airflow passing substantially horizontally from the front side toward the rear side of the motorcycle 401 is taken into the air duct 427 through the air introduction port 428. The running airflow entering the air duct 427 is blown off from the air blow-off port 429 with an upward rearward orientation (see arrow 400B in the figures), with its flow direction being varied toward the rear upper side along the air passage 430.

In this case, in the curved part 430a of the air passage 430, the airflow is deflected and a negative-pressure zone (low-pressure zone, or high-velocity zone) 400F (see FIG. 12) is thereby generated. However, the generation of the negative-pressure zone 400F is suppressed to a small volume on the back side of the screen body 426 and a small volume on the back side of the partition wall part 433. In other words, the partition wall part 433 not only produces a straightening effect on the running airflow passing through the air duct 427 (particularly, through the curved part 430a) but also reduces the volume of the negative-pressure zone 400F in the air passage 430 so as to reduce the passage resistance, thereby contributing to enhancement of the rigidity of the screen 425 as a whole.

The airflow blown off from the air blow-off port 429 acts to vary the flow direction of the running airflow passing over the screen 425 and tending to reach the rider 400J, toward the upper rear side (see arrow 400C in FIG. 10). This makes it possible to suppress the quantity of the airflow toward the rider 400J (namely, to obtain a favorable screen effect) while suppressing the magnitude of the screen height. In this case, the airflow changed in direction to the upper rear side is guided mainly to the surroundings of the head of the rider 400J (the surroundings of the helmet). Since the air blow-off port 429 is provided so as to range from the left end to the right end of the upper edge part of the front cover 416, the blow-off width of the running airflow passed through the air duct 427 is enlarged, whereby the range over which the screen effect is obtained is increased.

Figure 13:
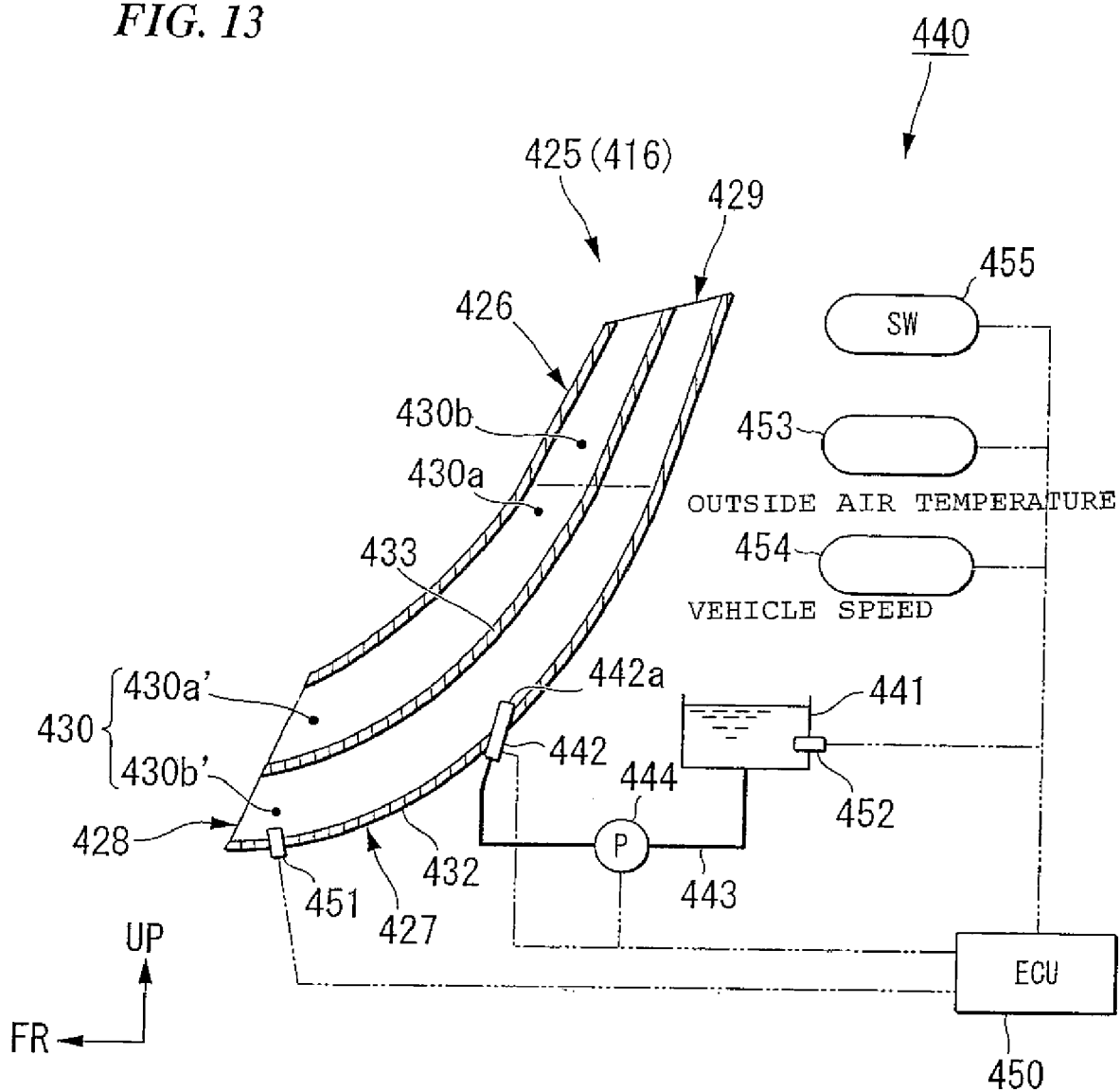
FIG. 13 is a structural view of a cool airflow device provided at a windshield device in the motorcycle shown in FIG. 10.

As shown in FIG. 13, the motorcycle 401 includes a cool airflow device 440 by which the running airflow can be cooled through the air duct 427. The cooled airflow can be supplied as a cool airflow to the rider 400J side.

The cool airflow device 440 jets water in a fog form into the air passage 430 (inside passage 430b') in the air duct 427, so as to cool the air blown off from the air duct 427 by utilizing the heat of evaporation of the water thus jetted. In addition to the screen 425 (front cover 416) and the air duct 427, the cool airflow device 440 includes a water reservoir tank 441 for reserving water to be supplied into the air passage 430, an injector 442 for jetting water supplied from the water reservoir tank 441 into the air passage 430 in a fog-like form, a water supply passage 443 connecting the injector 442 and the water reservoir tank 441 to each other, a water pump 444 provided in the water supply passage 443 so as to feed water under pressure to the injector 442 side, a control unit 450 for controlling the operations of the water pump 444 and the injector 442, an air flow meter 451 for detecting the quantity of the running airflow passing through the air passage 430, a water temperature sensor 452 for detecting the water temperature in the water reservoir tank 441, an outside air temperature sensor 453 for detecting the outside air temperature, a vehicle speed sensor 454 for detecting the running speed of the motorcycle 401, and a water supply control switch 455 for permitting the quantity of water supplied into the air passage 430 and the like quantities to be controlled by the rider 400J.

The injector 442 is of the solenoid type in which a plunger is reciprocated in a tubular body to open and close a jet port 442a by the presence or absence of energizing of a solenoid coil, wherein water in the water reservoir tank 441 is fed under pressure through the water pump 444 to the injector 442. In this condition, the jet port 442a is opened, whereby foggy water is injected into the air passage 430. The jet port 442a of the injector 442 is so disposed as to be directed upward along a roughly rectilinear part 430b, at the rear wall part 432 (the outer periphery side) of the curved part 430a of the air passage 430.

The control unit 450 controls the operations of the water pump 444 and the injector 442, i.e. controls the supply of water into the air passage 430, based on detection data sent from the air flow meter 451, the vehicle speed sensor 454, the water temperature sensor 452 and the outside air temperature sensor 453, the position of the water supply control switch 455, and the like.

Specifically, the control unit 450 performs such a control that when the motorcycle 401 is running at a low speed (for example, when the vehicle speed is less than 40 km/h), it is determined that good evaporation of water supplied cannot be expected in view of the deficiency in the quantity of the airflow, and the supply of water into the air passage 430 is stopped, and, thus, the supply of water into the air passage 430 is conducted only when the motorcycle 1 is running at a medium or high speed (for example, when the vehicle speed is not less than 40 km/h).

In addition, when an indication that the quantity of airflow in the air passage 430 is less than a predetermined value is supplied to the control unit 450 in addition to the vehicle speed data, the control unit 450 stops the supply of water into the air passage 430 irrespectively of the vehicle speed data and the like, for the same reason as above-mentioned.

Furthermore, also in the case where the water temperature in the water reservoir tank 441 is for example less than a predetermined value or in the case where the outside air temperature is less than a predetermined value, the control unit 450 determines that good evaporation of water supplied cannot be expected, and stops the supply of water into the air passage 430, irrespectively of the vehicle speed data and the like.

In brief, the control unit 450 controls the operation of the injector 442 and, hence, regulates appropriately the quantity of water injected into the air passage 430, according to the vehicle speed, the quantity of airflow, the water temperature and the outside air temperature.

Thus, with water supplied into the air passage 430 according to the various surrounding conditions, assured evaporation of water is obtained, and the running airflow can thereby be cooled favorably through the air passage 430.

In the cool airflow device 440 as above, execution and stop of the supply of water into the air passage 430 can be selectively changed over by, for example, turning ON and OFF the water supply control switch 455 provided at the steering handle 409. Specifically, when the water supply control switch 455 is ON, water is automatically supplied into the air passage 430 by the above-mentioned control, and when the water supply control switch 455 is OFF, the above-mentioned control is not carried out and the supply of water into the air passage 430 is stopped. The water supply control switch 455 may have an intermediate position or positions for changing over the quantity of water supplied, as well as the positions for changeover between execution and stop of the water supply.

As has been described above, the cool airflow device 440 for the motorcycle 401 in the fourth embodiment includes the front cover 416 provided at a front part of the vehicle body of the motorcycle 401 so as to obtain a windshield effect for the rider 400J on the rear side thereof, and the air duct 427 provided in the front cover 416 so as to guide the running airflow toward the rider 400J side, and further includes the injector 442 for supplying foggy water into the air passage 430 in the air duct 427.

This construction ensures that the running airflow passing through the air passage 430 is cooled by utilizing the evaporation heat of foggy water supplied into the air passage 430 in the air duct 427, and, by appropriately supplying the running airflow (cool airflow) toward the rider 400J side, a comfortable driving can be realized even when the outside air temperature is high, while obtaining the windshield effect for the rider 400J by the front cover 416.

The cool airflow device 440 includes the water pump 444 for supplying water in the water reservoir tank 441 to the injector 442, and the control unit 450 for controlling the operation of the water pump 444, whereby it is possible to freely control the supply of water to the injector 442 and, hence, the supply of water into the air passage 430.

Further, the cool airflow device 440 has the air flow meter 451 for detecting the quantity of the running airflow passing through the air passage 430, and the control unit 450 controls the supply of water into the air passage 430 according to detection data sent from the air flow meter 451, whereby water can be appropriately supplied according to the quantity of the running airflow passing through the air passage 430, and the running airflow can be cooled assuredly.

Furthermore, the cool airflow device 440 has the water supply control switch 455 for permitting the supply of water into the air passage 430 to be controlled by the rider 400J. This configuration makes it possible to control the presence and absence of the supply of water into the air passage 430 and, hence, the temperature of the running airflow passing through the air passage 430, according to the preference of the rider 400J.

In addition, in the cool airflow device 440, the air passage 430 has the curved part 430a, and the injector 442 is disposed at the curved part 430a. This makes it possible to dispose the injector 442 straight in orientation toward the downstream side of the air passage 430, to accelerate evaporation of water, and to thereby cool the running water favorably.

Further, in the cool airflow device 440, the air duct 427 has the air introduction port 428 provided at a front part of the front cover 416 and opened toward the front side of the vehicle, and the air blow-off port 429 provided at an upper part of the front cover 416 and opened toward the upper side, and the air introduction port 428 and the air blow-off port 429 communicate with each other through the air passage 430. This ensures that the running airflow taken in through the air introduction port 428 can be blown off toward the upper side from the air blow-off port 429, and an appropriate screen effect for the rider 400J can be obtained while suppressing the magnitude of the height of the front cover 416 (screen height).

Furthermore, in the cool airflow device 440, water is supplied into the air passage 430 only when the value detected by the vehicle speed sensor 454 is within a predetermined range, whereby the supply of water into the air passage 430 can be stopped at the time of low-speed running (the quantity of airflow is small) when evaporation of water jetted from the injector 442 cannot be expected, or in the like situations.

Fifth Embodiment

Figure 14:
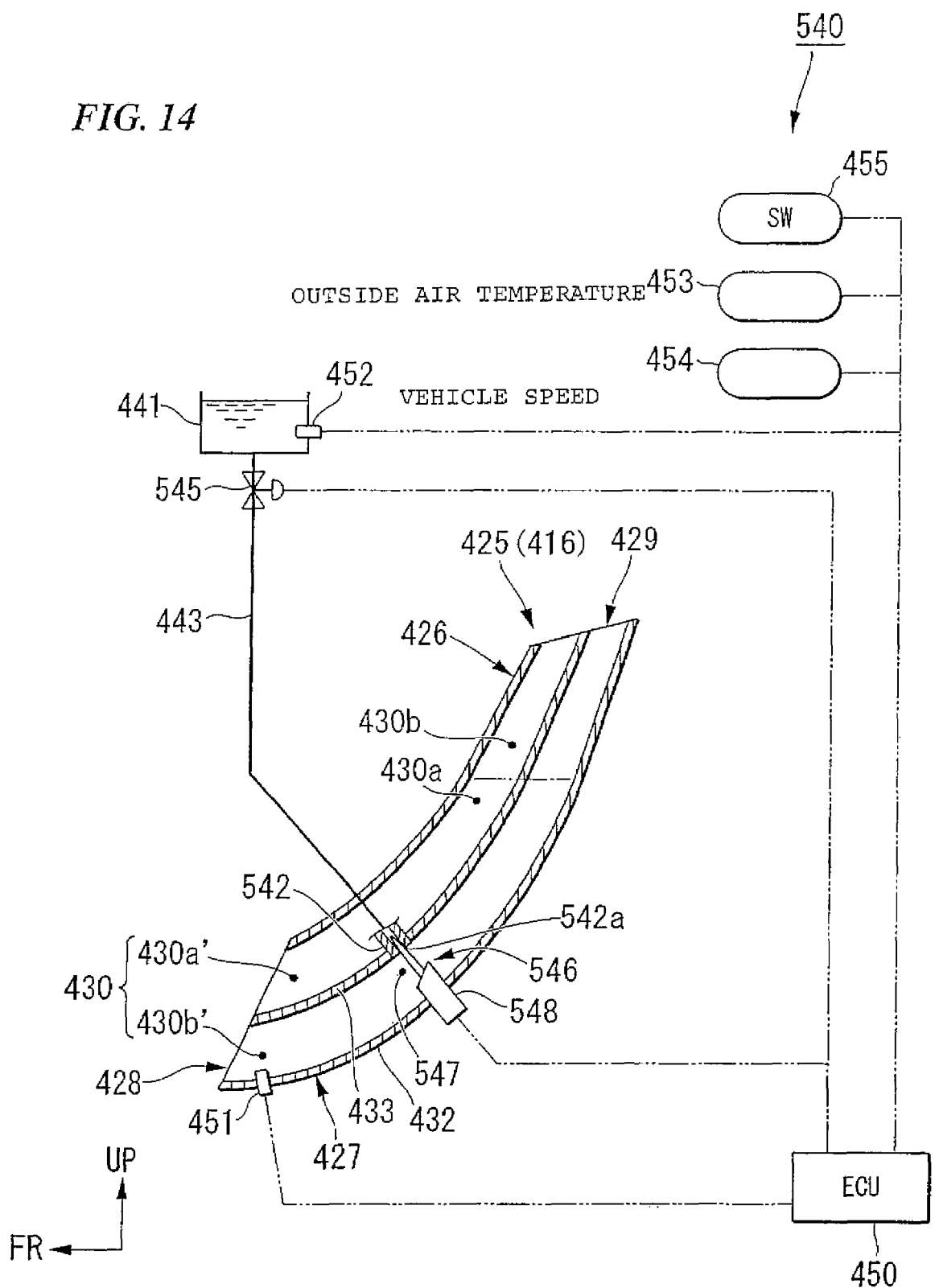
FIG. 14 is a left side view, corresponding to FIG. 13, of a fifth embodiment of the present invention.

Now, a fifth embodiment of the present invention will be described below, referring to FIG. 14.

A cool airflow device 540 in this embodiment is different from that in the fourth embodiment mainly in that a water supply nozzle 542 for supplying water at normal pressure into the air passage 430 is provided in place of the above-mentioned injector 442. The same parts as those in the fourth embodiment above are denoted by the same symbols used above, and descriptions of them will be omitted.

In addition to the screen 425 (front cover 416) and the air duct 427 as above-mentioned, the cool airflow device 540 includes the water reservoir tank, an air flow meter 451, a water temperature sensor 452, an outside air temperature sensor 453, a vehicle speed sensor 454, a water supply control switch 455 and a control unit 450. Further, the cool airflow device 540 has a spraying part 546 for supplying water in the water reservoir tank into the air passage 430, a water supply line 443 connecting the spraying part 546 and the water reservoir tank 441 to each other, and a solenoid valve 545 provided in the water supply line 443 so as to open and close the line.

The spraying part 546 includes a water supply nozzle 542 for opening a water supply port 542a into the air passage 430, and a venturi piston 548 which controls the opening of the water supply port 542a of the water supply nozzle 542 and which constitutes a variable venturi part 547 in the air passage 430. The water supply port 542a of the water supply nozzle 542 is disposed in orientation toward roughly the radially outer side at a partition wall part 433 (inner periphery side) of a curved part 430a of the air passage 430 (inside passage 430b'). In addition, the venturi piston 548 is disposed opposite to the water supply port 542a, and is reciprocated by a drive source (not shown) so as thereby to vary the opening of the water supply port 542a and the venturi diameter of the variable venturi part 547.

When the motorcycle 401 is running, the solenoid valve 545 opens the water supply line 443, and the venturi piston 548 is put into strokes according to the vehicle speed, the quantity of airflow, etc. As a result, the opening of the water supply port 542a and the venturi diameter of the variable venturi part 547 are varied, water is sucked in through the water supply port 542a in a quantity according to the vehicle speed and the quantity of airflow, and the water is supplied in a fog form into the air passage 430. In this case, since the water supply port 542a of the water supply nozzle 542 is opened into a negative-pressure zone 400F formed on the inner periphery side of the curved part 430a, the suction of water from the water supply port 542a is conducted favorably, and evaporation of water is accelerated by the high-flow-rate running airflow.

The control unit 450 controls the operations of the solenoid valve 545 and the venturi piston 548, i.e., the supply of water into the air passage 430, based on detection data sent from the air flow meter 451, the vehicle speed sensor 454, the water temperature sensor 452 and the outside air temperature sensor 453, and the position of the water supply control switch 455 and the like data. A specific example of the control is equivalent to that in the fourth embodiment, and description thereof is omitted.

As has been described above, in the cool airflow device 540 in the fifth embodiment, the water supply nozzle 542 (spraying part 546) for supplying water in a fog form into the air passage 430 in the air duct 427 is provided. Like in the fourth embodiment, this configuration ensures that the running airflow passing through the air passage 430 is cooled by utilizing the heat of evaporation of foggy water supplied into the air passage 430 in the air duct 427, and, by appropriately supplying the running airflow (cool airflow) to the side of the rider 400J, a comfortable driving can be realized even when the outside air temperature is high, while obtaining a windshield effect for the rider 400J by the front cover 416.

Especially, in the cool airflow device 540, the water supply nozzle 542 is opened (the water supply port 542a is disposed) to the inner periphery side of the curved part 430a of the air passage 430, whereby water can be supplied into the high-flow-rate zone (negative-pressure zone 400F), evaporation of water is accelerated, and the running airflow can be cooled favorably.

Sixth Embodiment

Figure 15:
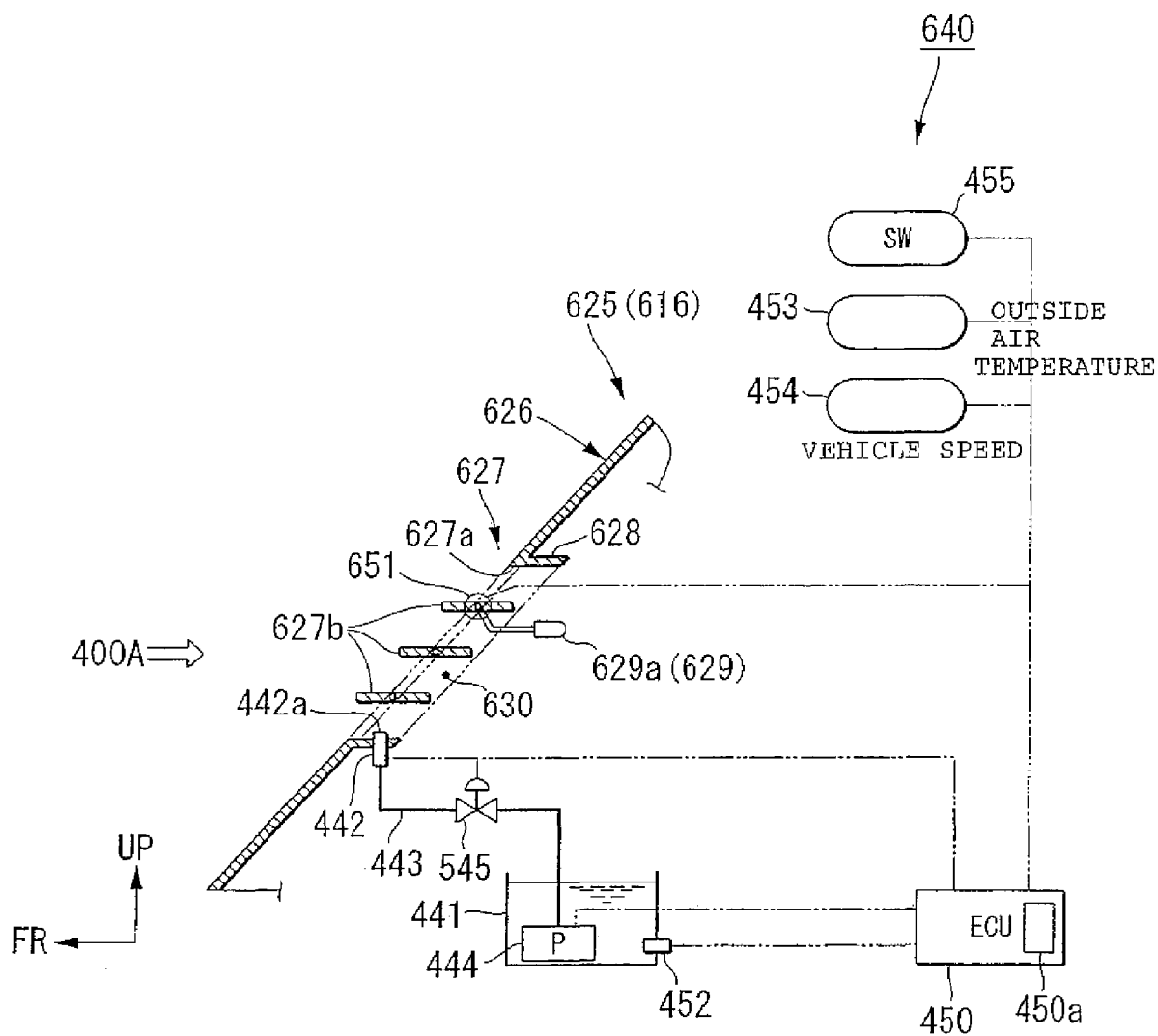
FIG. 15 is a left side view, corresponding to FIG. 13, of a sixth embodiment of the present invention.

Now, a sixth embodiment of the present invention will be described below, referring to FIG. 15.

A cool airflow device 640 in this embodiment differs from those in the fourth and fifth embodiments mainly in that a screen 625 (front cover 616) without an air duct 427 is provided in place of the above-mentioned screen 425 (front cover 416) and that the screen 625 has an airflow guide part 627 for permitting a portion of the running airflow to pass therethrough to the rear side. The same parts as those in the fourth and fifth embodiments above are identified by the same symbols as used above, and descriptions of them will be omitted.

The screen 625 mainly includes only a screen body 626, which corresponds to the above-mentioned screen body 426. An upper edge part of the screen body 626 is extended about to the height of the head of a rider 400J. The screen body 626 is provided in its central part with the airflow guide part 627 permitting a portion of the running airflow to pass therethrough to the inside (the rider 400J side) of the front cover 616.

The airflow guide part 627 has an opening 627a having a laterally elongate rectangular shape in front view, and a plurality of louvers 627b arranged in the opening 627a at vertical intervals. A comparatively short peripheral wall part 628 is erected rearwards at the peripheral edge of the opening 627a, and a comparatively short air passage 630 extending substantially horizontally in the front-rear direction is formed on the inner side of the peripheral wall part 628.

The louvers 627b each have a plate-like shape along the left-right direction, and they are provided to be mutually parallel over the entire left-right width of the opening 627a and at predetermined intervals. Each of the louvers 627b can be turned about an axis extending along the left-right direction, and its inclination angle can be appropriately controlled between a full-opening state for fully opening the air passage 630 by being substantially horizontal and a full-closing state for fully closing the air passage 630 by being inclined to be substantially parallel to the screen 625.

In addition to the above-mentioned screen 625 (front cover 616) and the airflow guide part 627, the cool airflow device 640 includes the water reservoir tank 441, an injector 442, a water supply line 443, a water pump 444, a solenoid valve 545, a water temperature sensor 452, an outside air temperature sensor 453, a vehicle speed sensor 454, a water supply control switch 455 and a control unit 450. Further, the cool airflow device 640 has an angle control mechanism 629 for varying simultaneously the inclination angles of the louvers 627b, and an angle sensor 651 for detecting the inclination angle of the louvers 627b.

The angle control mechanism 629 is, for example, of a manual type, in which an operating lever 629a is projected to the rear side (the rider 400J side) of the screen 625, and the operating lever 629a can be operated by the rider 400J seated on a seat 420.

The angle sensor 651 is provided, for example, at one end of one of the louvers 627b, and detection data from the angle sensor 651 is inputted to an arithmetic part 450a in the control unit 450. In the arithmetic unit 450a, data on the quantity of the running airflow passing through the air passage 630 is calculated, based on the detection data (data on the opening of the air passage 630) from the angle sensor 651 and the detection data from the vehicle speed sensor 454.

The angle control mechanism 629 may be, for example, of an electrically driven type, in which the operation is conducted through the control unit 450 according to an operation on a switch provided at the steering handle 409 or the like. In this case, the inclination angle of the louvers 627b, or the quantity of the running airflow passing through the air passage 630, may be detected from a drive source such as a motor in the angle control mechanism 629 or detected directly from a driving circuit in the control unit 450 or the like. In addition, a jet port 442a of the injector 442 is disposed to be directed from the lower side of the air passage 630 toward the side of the center of the air passage 630 (toward the upper side).

The control unit 450 controls the operations of the water pump 444, the solenoid valve 545 and the injector 442, i.e., the supply of water into the air passage 630, based on the detection data from the angle sensor 651, the vehicle speed sensor 454, the water temperature sensor 452 and the outside air temperature sensor 453, and the position of the water supply control switch 455 and the like data. A specific example of the control is equivalent to that in the fourth embodiment, and description thereof is omitted. In addition, the water pump 444 is connected to a terminal end of the water supply line 443 in the water reservoir tank 441.

As has been described above, in the cool airflow device 640 in the sixth embodiment, the injector 442 for supplying foggy water into the air passage 630 in the airflow guide part 627 is provided. Like in the fourth and fifth embodiments, this configuration ensures that the running airflow passing through the air passage 630 is cooled by utilizing the evaporation heat of the foggy water supplied into the air passage 630 in the airflow guide part 627, and, by appropriately supplying the running airflow (cool airflow) to the rider 400J side, a comfortable driving can be realized even when the outside air temperature is high, while obtaining the windshield effect for the rider 400J by the front cover 616.

Especially, the cool airflow device 640 includes the plurality of louvers 627b provided in the vicinity of the inlet of the air passage 630 in the airflow guide part 627 so as to control the opening of the air passage 630 (the quantity of the airflow passing through the air passage 630), the angle sensor 651 for detecting the angle of the louvers 627b (the opening of the air passage 630), the vehicle speed sensor 454 for detecting the running speed of the motorcycle 401, an arithmetic unit 450a for calculating the quantity of the running airflow passing through the air passage 630 on the basis of the detection data from the angle sensor 651 and the vehicle speed sensor 454, and the arithmetic unit 450a is used as the airflow quantity detecting means. This configuration makes it possible to control the quantity of airflow guided to the rider 400J side according to the preference of the rider 400J, and to appropriately supply water according to the quantity of airflow, or the angle of the louver 627b, and the vehicle speed.

The present invention is not limited to the above-described embodiments. For example, in the fourth and fifth embodiments, a configuration may be adopted in which the air duct 427, the air introduction port 428 and the air blow-off port 429 are provided separately from the screen 425 or are provided in the front cover 416. In addition, the air introduction port 428 may be provided with opening control means such as louvers similar to those in the sixth embodiment.

In addition, in the sixth embodiment, the screen 625 (front cover 616) may be provided with a spraying part 546 of venturi structure which is similar to that in the fifth embodiment.

Further, in each of the above embodiments, a configuration in which water drips into the air passage in the airflow guide part or a configuration in which the inside wall of the airflow guide part is provided with a wetted part composed of a nonwoven fabric or the like, may be adopted.

Each of the configurations in the above embodiments is merely an example, the application of the present invention is naturally not limited to the application to the motor scooter type motorcycle, and various modifications are naturally possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield device provided at a front part of a vehicle body of a saddle ride type vehicle, comprising:
    an air introduction port provided at a front part of said windshield device and opened toward the front side of said vehicle body;
    an air blow-off port provided at an upper part of said windshield device and opened toward the upper side;
    an air duct establishing communication between said air introduction port and said air blow-off port through an air passage extending rearwardly upwards, said air duct including a curved part and a rectilinear part before the air blow-off port; and
    a first straightening vane extending sideways in said air passage and inclined rearwardly upwards so as to be along said air passage, the first straightening vane being located only in the curved part; and
    a second straightening vane to be continuous from said air introduction port to said air blow-off port,
    wherein in side view of said vehicle, a first straight line connecting both ends of said second straightening vane is disposed at an obtuse angle in relation to a second straight line being orthogonal to a steering axis and extending to a grounding point of a rear wheel,
    said first straightening vane is an auxiliary straightening vane,
    said curved part is curved to be inclined more steeply as one goes toward the rear side in side view of the vehicle, an air passage provided in said curved part and on at least one of a face side and a back side of said second straightening vane is provided with said auxiliary straightening vane curved similarly to said curved part, and a third straight line connecting both ends of said auxiliary straightening vane is disposed at an obtuse angle in relation to said second straight line in side view of said vehicle.

2. The windshield device as set forth in claim 1, wherein said curved part is curved to be inclined more steeply as one goes toward the rear side, and said straightening vane is curved so as to be along said curved part.

3. The windshield device as set forth in claim 1, wherein a plurality of said auxiliary straightening vanes are provided, one auxiliary straightening vane of the plurality of straightening vanes is provided on each of the face side and the back side of said second straightening vane.

4. A windshield device provided at a front part of a vehicle body of a saddle ride type vehicle, comprising:

an air introduction port provided at a front part of said windshield device and opened toward the front side of said vehicle;

an air blow-off port provided at an upper part of said windshield device and opened toward the upper side; and an air duct establishing communication between said air introduction port and said air blow-off port, wherein at least a part of a front wall part of said air duct is in the shape of an inverted aerofoil having an upside-down aerofoil sectional shape, a lower surface of the inverted aerofoil defining an upper surface of said part of the front wall part, an upper surface of the inverted aerofoil defining an inner surface of said part of the front wall part, and a profile of the lower and upper surfaces of said part of the front wall part form a teardrop shape.

5. The windshield device as set forth in claim 4, wherein an outside surface of said wall part is provided with a projected part extending along an airflow.

6. The windshield device as set forth in claim 4, wherein the left-right width of said inverted aerofoil is substantially equal to the left-right width of said air duct.

7. The windshield device as set forth in claim 4, wherein said air duct forms a plurality of air passages.

* * * * *